United States Patent
Palick et al.

(10) Patent No.: US 7,669,453 B2
(45) Date of Patent: Mar. 2, 2010

(54) CARTRIDGE FOR MACHINE TOOL

(75) Inventors: Ronald Palick, Harris, MN (US); Brian J. Lee, Elk River, MN (US); John H. Morehead, White Bear Lake, MN (US); Richard L. Timp, Vadnais Heights, MN (US)

(73) Assignee: Wilson Tool International Inc., White Bear Lake, MN (US)

( * ) Notice: Subject to any disclaimer, the term of this patent is extended or adjusted under 35 U.S.C. 154(b) by 1039 days.

(21) Appl. No.: 11/355,792

(22) Filed: Feb. 16, 2006

(65) Prior Publication Data

US 2007/0191199 A1   Aug. 16, 2007

(51) Int. Cl.
*B21J 13/08*   (2006.01)

(52) U.S. Cl. .......................... 72/444; 72/446

(58) Field of Classification Search ............... 72/444, 72/446, 447, 448; 483/29; 83/563, 564, 83/698.91; 29/559
See application file for complete search history.

(56) References Cited

U.S. PATENT DOCUMENTS

| | | | | |
|---|---|---|---|---|
| 3,678,562 A | * | 7/1972 | Leibinger | 483/1 |
| 4,588,339 A | | 5/1986 | Bilz | 409/234 |
| 4,656,463 A | | 4/1987 | Anders | 340/572 |
| 4,720,907 A | | 1/1988 | Rapp | 29/568 |
| 4,742,470 A | | 5/1988 | Juengel | 364/474 |
| RE32,837 E | | 1/1989 | Corni | 235/375 |
| 4,922,591 A | | 5/1990 | Campbell | 29/26 |
| 4,951,375 A | * | 8/1990 | Erlenmaier | 483/4 |
| 5,046,014 A | | 9/1991 | Anjo | 364/474.02 |
| 5,142,128 A | | 8/1992 | Perkin | 235/375 |
| 5,193,421 A | | 3/1993 | Meisinger | 82/1.11 |
| 5,224,915 A | | 7/1993 | Kilian | |
| 5,257,199 A | | 10/1993 | Tsujino | 364/474.02 |
| 5,595,560 A | | 1/1997 | Kamada | 483/1 |
| 5,669,866 A | * | 9/1997 | Julian et al. | 483/1 |
| 5,943,240 A | | 8/1999 | Nakamura | 364/475.02 |
| 5,983,688 A | | 11/1999 | Anzai | 72/15.1 |

(Continued)

FOREIGN PATENT DOCUMENTS

EP   0155662 A   9/1985

(Continued)

OTHER PUBLICATIONS

Trumpf plastic cartridge: eight photographs thereof, and related information (e.g., cartridge weight) stated in the enclosed Supplemental Information Disclosure Statement.

(Continued)

*Primary Examiner*—Dana Ross
*Assistant Examiner*—Debra M Sullivan
(74) *Attorney, Agent, or Firm*—Fredrikson & Byron, P.A.

(57) ABSTRACT

A cartridge for a machine tool is provided. The cartridge has a main body, two punch-retention arms, and two die-retention arms. Preferably, the two punch-retention arms are spaced apart and at least generally parallel to each other. Likewise, the two die-retention arms preferably are spaced apart and at least generally parallel to each other. In some cases, the main body is formed of a first metal, and the punch-retention arms and die-retention arms are formed of metal(s) different than the first metal. In one group of embodiments, the invention provides a cartridge having a weight of less than 3 pounds.

57 Claims, 28 Drawing Sheets

U.S. PATENT DOCUMENTS

| | | | |
|---|---|---|---|
| 6,047,579 A | 4/2000 | Schmitz | 72/15.1 |
| 6,163,734 A | 12/2000 | Shigefuji | 700/160 |
| 6,196,042 B1 * | 3/2001 | Distefano et al. | 72/325 |
| 6,327,884 B1 * | 12/2001 | Wills | 72/46 |
| 6,344,018 B1 | 2/2002 | Aizawa | 483/29 |
| 6,568,593 B2 | 5/2003 | Hetzer | 235/385 |
| 6,585,628 B1 | 7/2003 | Tsung | 483/9 |
| 6,786,239 B1 | 9/2004 | Welsh | |
| 2002/0056749 A1 | 5/2002 | Hetzer | |
| 2003/0196471 A1 * | 10/2003 | Huebner et al. | 72/402 |
| 2003/0226887 A1 | 12/2003 | Komine | 235/375 |
| 2005/0016235 A1 | 1/2005 | Zusi | 72/15.1 |
| 2005/0097338 A1 | 5/2005 | Lee | |
| 2005/0173685 A1 * | 8/2005 | Skach | 254/25 |
| 2007/0186744 A1 | 8/2007 | Lee | |

FOREIGN PATENT DOCUMENTS

| | | |
|---|---|---|
| GB | 2185130 A | 7/1987 |
| GB | 2336331 A | 10/1999 |
| JP | 2002178060 | 6/2002 |
| JP | 2003164928 | 6/2003 |

OTHER PUBLICATIONS

Trumpf original style iron cartridge: eight photographs thereof, and related information (e.g., cartridge weight) stated in the enclosed Supplemental Information Disclosure Statement.

Trumpf new style iron cartridge: eight photographs thereof, and related information (e.g., cartridge weight) stated in the enclosed Supplemental Information Disclosure Statement.

International Search Report and the Written Opinion, dated Nov. 9, 2007 for corresponding PCT Application No. PCT/US2006/062233 (16 pages).

* cited by examiner

CARTRIDGE FOR MACHINE TOOL

FIELD OF THE INVENTION

The invention relates generally to cartridges for holding tool sets. More particularly, the invention relates to cartridges for holding tool sets for machine tools.

BACKGROUND OF THE INVENTION

Machine tools are usually adapted for being used with many different tool sets. A typical tool set includes a punch and a corresponding die. A stripper plate is also commonly included as part of the tool set. In processing a workpiece (e.g., a piece of sheet metal), it is common to use several different tool sets. In some cases, once a first tool set has been used, it is exchanged for a second tool set, and then a third, and so on. Once a first workpiece has been fully processed using the desired sequence of tool sets, a second workpiece may be processed, in some cases beginning again with the first tool set.

The tool sets used on a machine tool commonly are stored in cartridges. Some cartridges may be stored in the machine tool, while others may be kept nearby. When several different tool sets (e.g., of different size and/or shape) will be used for a job, the machine tool is commonly provided with cartridges respectively holding the different tool sets. Not only do the cartridges store the tools, they also facilitate loading and unloading the tools on the machine tool. For example, when it is desired to use a particular tool set, a cartridge holding that tool set is moved to a mounting position on the machine tool. At the mounting position, the tools are removed from the cartridge and loaded onto the machine tool. Once use of that tool set is finished, its tools are unloaded from the machine tool and loaded back onto the cartridge. The cartridge is then moved away from the mounting position. Then, a different cartridge (holding another tool set) can be moved to the mounting position so that a new set of tools can be used by the machine tool. This process is repeated for as many different tool sets as are needed for a given job. In some cases, the machine tool includes an elongated rail for storing the cartridges. The cartridges, for example, can be slidably engaged with the rail such that they can be slid back and forth to and from the mounting position. In other cases, the cartridges are stored in a rotary storage system, a round carousel, or a stacked storage system. The mounting and dismounting of tool sets using cartridges is described in U.S. Pat. No. 4,951,375. This '375 patent is incorporated herein by reference to the extent it shows and describes the structure of an exemplary machine tool with a cartridge guidance system.

Since cartridges are moved by the machine tool, there is often wear and tear on the cartridges. This can result in cartridge breakage. Cartridges have been made of cast iron, so as to minimize breakage. However, these cast iron cartridges are very heavy. As a result, they are less than ideal in terms of their great inertia, which adversely impacts the dynamic performance of a machine tool in loading, unloading, and otherwise moving the cartridges. Heavy cartridges also cause unnecessary wear and tear on the machine tool. Due to these problems, plastic/composite cartridges have been used as an alternative. These cartridges are lighter and cheaper to manufacture. They also impose less wear and tear on the machine tool. However, these cartridges are still quite prone to breakage. While steel has been used for the cartridge arms that hold the punches and dies, these cartridges are nowhere near as strong and durable as the cast iron cartridges.

There is a need for a cartridge that is durable and resistant to breakage, while also being light enough to facilitate swift cartridge movements and/or to reduce wear and tear on the machine tool. It would also be desirable to provide cartridges that have one or more removable high-wear-location inserts. Further, it would be desirable to provide a cartridge with one or more coatings to improve the cartridge's performance and/or durability. Still further, it would be desirable to provide a cartridge having selected portions formed of particular metals, non-metals, and/or composites that improve the cartridge's performance and/or durability. Finally, it would be desirable to provide a metal cartridge having a weight approximating that of a conventional plastic cartridge.

SUMMARY OF THE INVENTION

Figure 1:
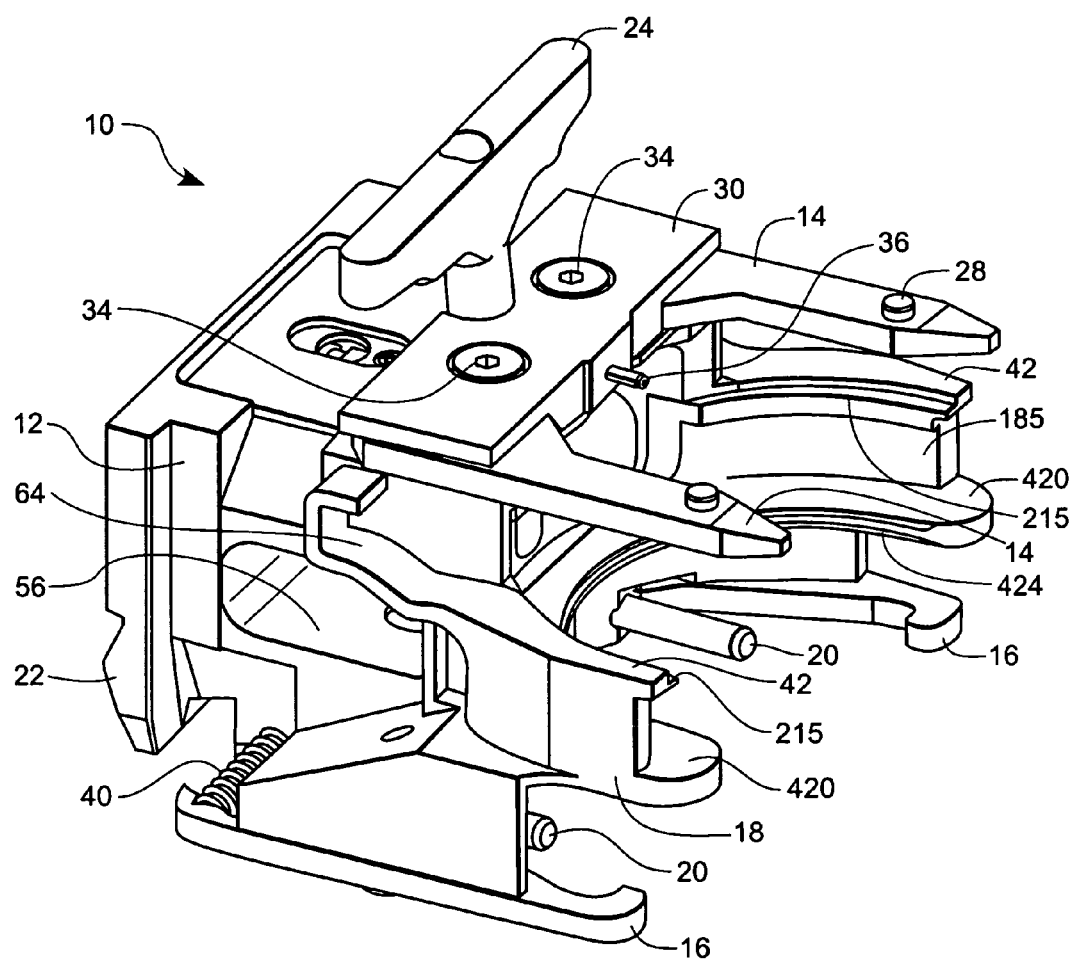
FIG. 1 is a perspective view of a cartridge according to a first embodiment of the invention.

In certain embodiments, the invention provides a tool set holder cartridge for a machine tool. The cartridge has a main body, two punch-retention arms, and two die-retention arms. Preferably, the two punch-retention arms are spaced apart and at least generally parallel to each other, the two die-retention arms are spaced apart and at least generally parallel to each other. In the present embodiments, the main body can optionally be formed of a first metal, and the punch-retention arms and die-retention arms can optionally be formed of metal(s) different than the first metal.

In certain embodiments, the invention provides a tool set holder cartridge for a machine tool. The cartridge has a main body, two punch-retention arms, two die-retention arms, and a stripper locator base. Preferably, the two punch-retention arms are spaced apart and at least generally parallel to each other, the two die-retention arms are spaced apart and at least generally parallel to each other, and the punch-retention arms extend outwardly away from an upper portion of the main body. In the present embodiments, the two punch-retention arms are mounted to the main body such that the punch-retention arms have a limited range of movement toward and away from each other. In these embodiments, the punch-retention arms are resiliently mounted to the main body such that the punch-retention arms are resiliently biased toward a default configuration characterized by the punch-retention arms being closer to each other than they are in any other configuration within their limited range of movement. Preferably, the die-retention arms extend outwardly away from a lower portion of the main body, and the two die-retention arms are preferably mounted to the main body such that the die-retention arms have a limited range of movement toward and away from each other. In the present embodiments, the die-retention arms are resiliently mounted to the main body such that the die-retention arms are resiliently biased toward a default configuration characterized by the die-retention arms being closer to each other than they are in any other configuration within their limited range of movement. The stripper locator base here can optionally be mounted to a middle portion of the main body. Preferably, the stripper locator base comprises two spaced-apart arm portions, the arm portions of the stripper locator base are not mounted resiliently for movement relative to the main body but rather are rigidly disposed relative to the main body, and the punch-retention arms and the die-retention arms and the stripper locator base are mounted removably to the main body such that they can be selectively removed and replaced.

In certain embodiments, the invention provides a tool set holder cartridge for a machine tool. In the present embodiments, the cartridge has two punch-retention arms, two die-retention arms, and preferably a main body formed of a metal (or formed of a composite comprising carbon fiber). Preferably, the two punch-retention arms are spaced apart and at least generally parallel to each other, and the two die-retention arms are spaced apart and at least generally parallel to each other. In the present embodiments, the two punch-retention arms are mounted to the main body such that the punch-retention arms have a limited range of movement toward and away from each other. In these embodiments, the punch-retention arms are resiliently mounted to the main body such that the punch-retention arms are resiliently biased toward a default configuration characterized by the punch-retention arms being closer to each other than they are in any other configuration within their limited range of movement. Similarly, the two die-retention arms are preferably mounted to the main body such that the die-retention arms have a limited range of movement toward and away from each other. In these embodiments, the die-retention arms are resiliently mounted to the main body such that the die-retention arms are resiliently biased toward a default configuration characterized by the die-retention arms being closer to each other than they are in any other configuration within their limited range of movement. In the present embodiments, the cartridge has a weight of less than 3 pounds, perhaps more preferably less than 2.75 pounds, or perhaps even less than 2 pounds. In some embodiments of this nature, each lateral side of the cartridge is provided with at least one weight-reduction pocket or opening, a bottom side of the cartridge is provided with at least one weight-reduction pocket or opening, and a front side of the cartridge is provided with at least one weight-reduction pocket or opening. Optionally, each such pocket or opening communicates with at least one of the others. The main body in the present embodiments, for example, can optionally be formed of an aircraft metal, and the punch-retention arms and die-retention arms can optionally be formed of steel.

DETAILED DESCRIPTION

With reference to the figures, a tool cartridge 10 is provided having a main body 12, two punch-retention arms 14, and two die-retention arms 16. The illustrated cartridge has (optionally its main body has) an upper portion 12a, a middle portion 12b, and a lower portion 12c. The punch-retention arms 14 preferably extend outwardly from the upper portion 12a, and the die-retention arms 16 preferably extend outwardly from the lower portion 12c. In the figures, the two punch-retention arms 14 are spaced apart from each other and are generally parallel to each other. Likewise, the illustrated die-retention arms 16 are spaced apart from each other and are generally parallel to each other. In other embodiments, though, the arms 14 are not generally parallel and/or the arms 16 are not generally parallel. The illustrated punch-retention arms 14 are generally parallel to the die-retention arms 16, although this may not be the case in all embodiments.

The main body 12 preferably comprises a block (which in certain embodiments is formed of an aircraft metal). Preferably, the punch-retention arms and die-retention arms are separately provided pieces, which are mounted to the main body (e.g., all four of these arms 14, 16 can optionally be mounted to, and/or secured alongside, a single integral block of the main body). In some cases, the punch-retention arms and die-retention arms are all mounted removably (and optionally pivotally) to the main body such that they can be selectively removed and replaced, e.g., if damaged or worn.

The punch-retention arms 14 preferably are mounted to the main body 12 such that these two arms have a limited range of movement toward and away from each other. In preferred cases, the arms 14 are resiliently mounted (e.g., pivotally) to the main body 12 such that the arms are resiliently biased toward a default configuration characterized by the arms being closer to each other than they are in any other configuration within their limited range of movement.

Figure 2:
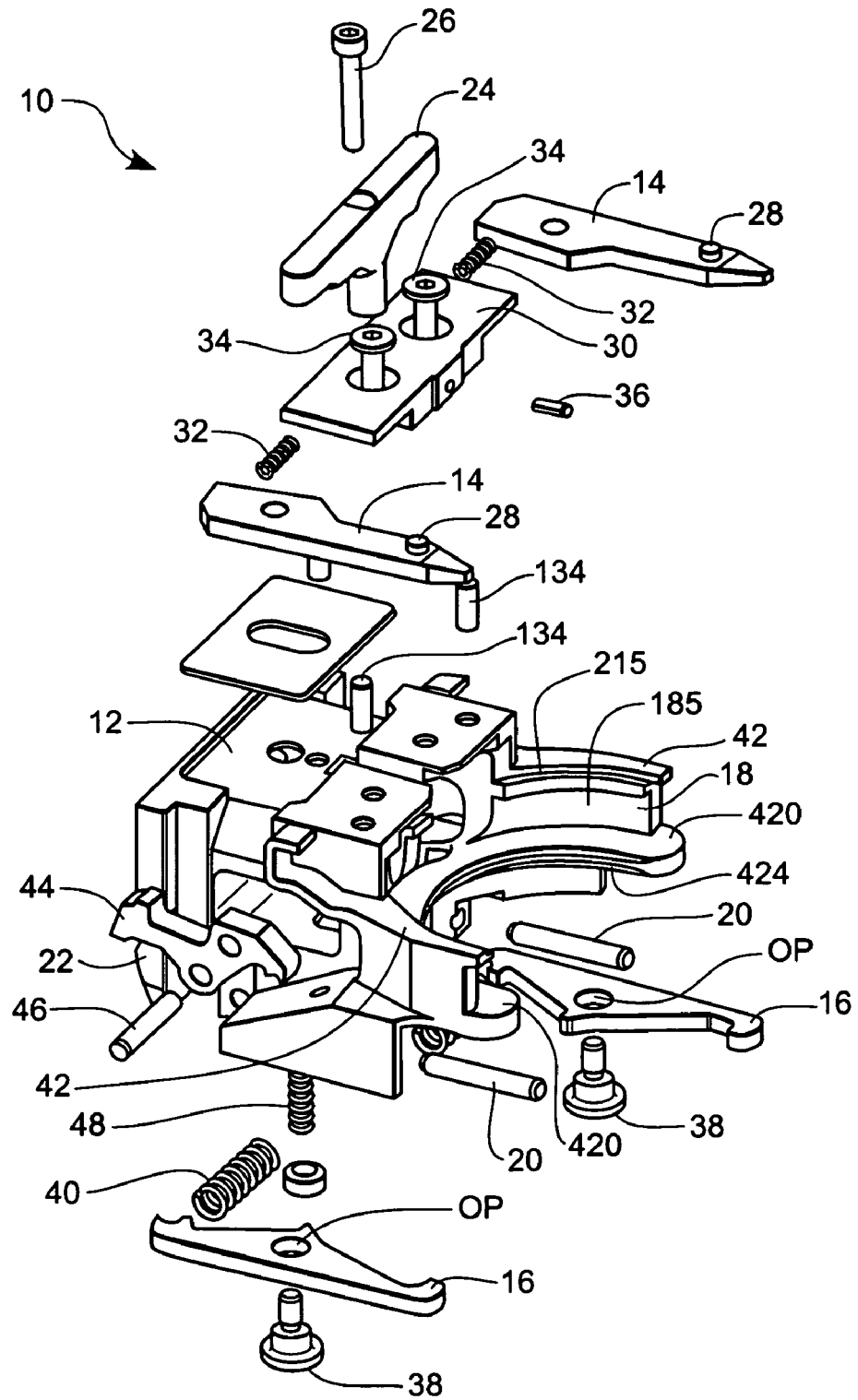
FIG. 2 is an exploded view of the cartridge illustrated in FIG. 1.
Figure 3:
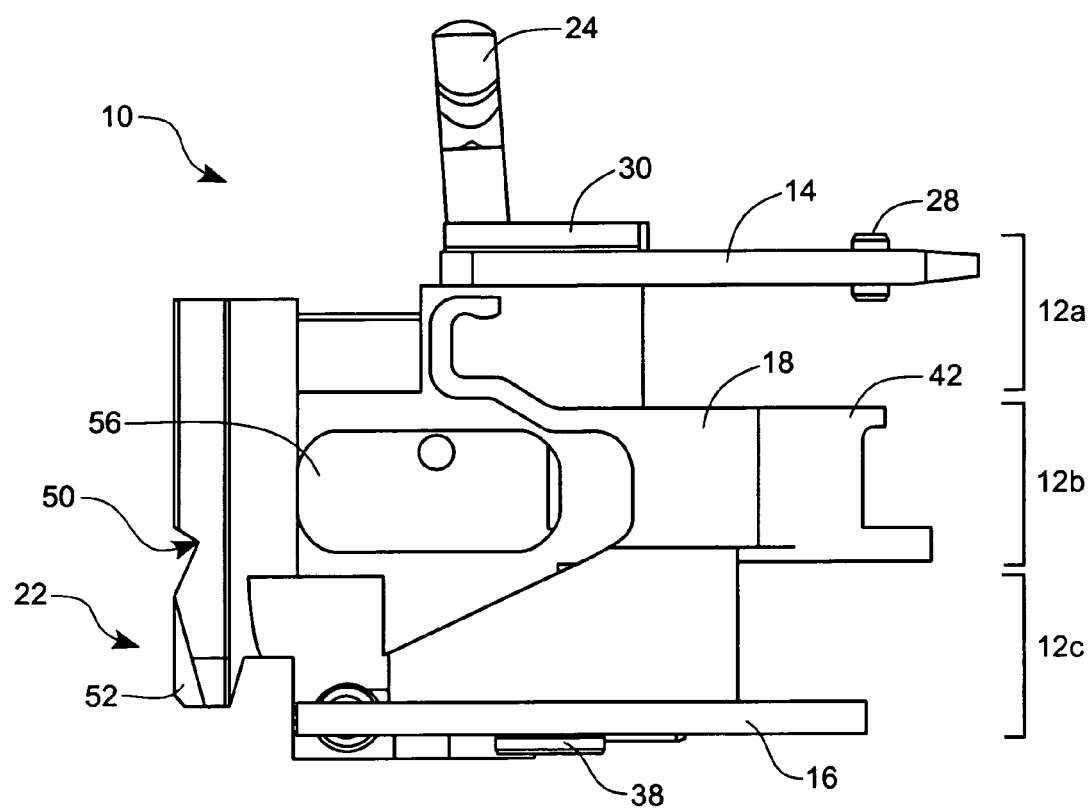
FIG. 3 is a right side view of the cartridge illustrated in FIG. 1.
Figure 3A:
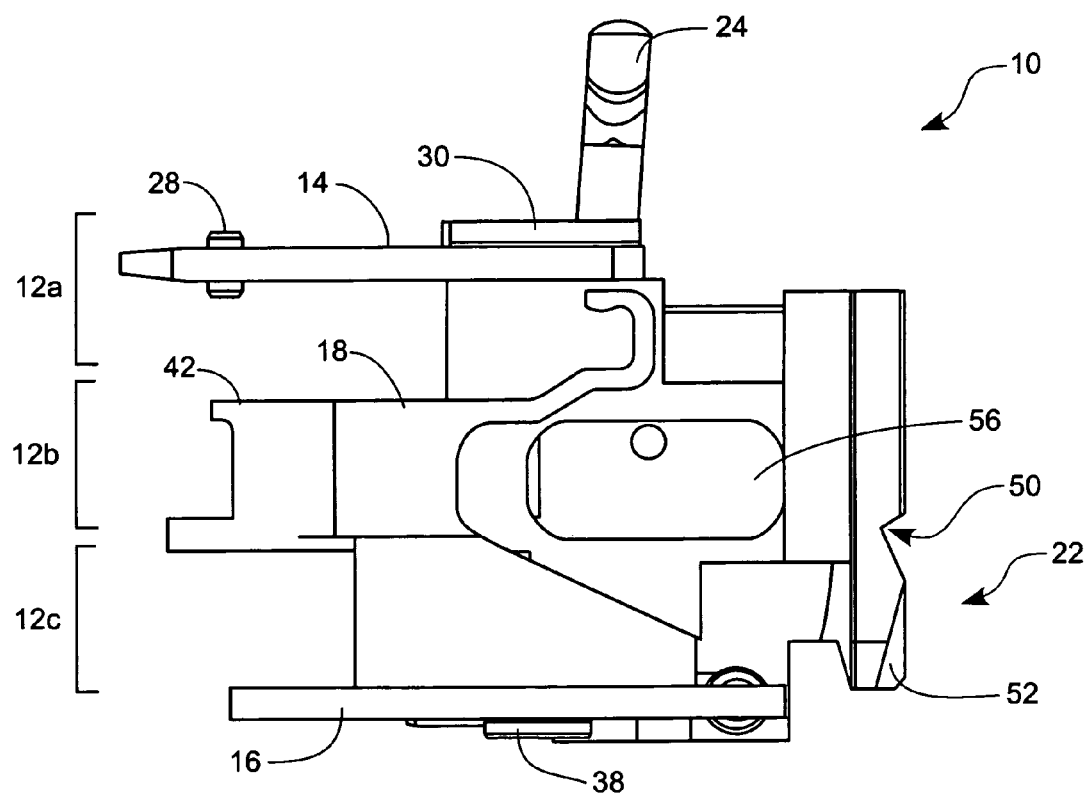
FIG. 3A is a left side view of the cartridge illustrated in FIG. 1.
Figure 4:
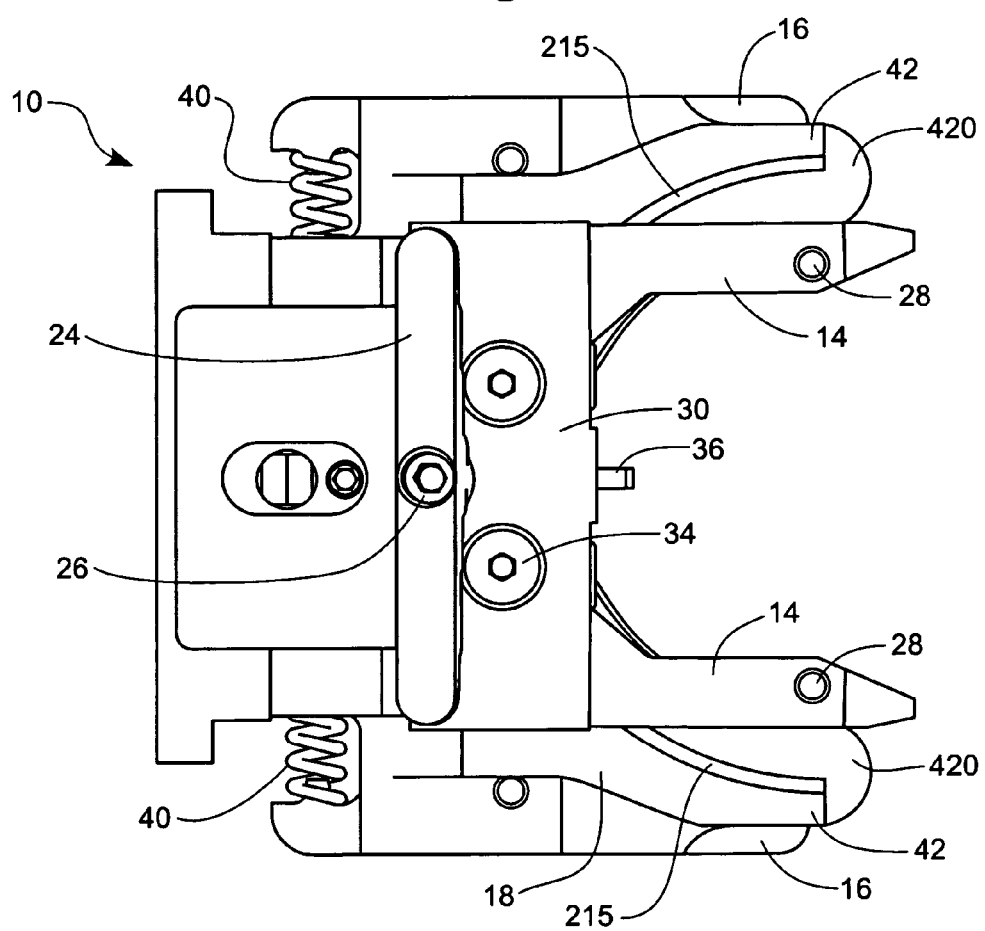
FIG. 4 is a top side view of the cartridge illustrated in FIG. 1.

In the illustrated embodiments, an optional center piece 30 is mounted to the main body 12 (e.g., using screws 34 or other suitable fasteners), e.g., such that a rear end region of each arm 14 is mounted between the bottom of the center piece 30 and the top of the main body 12. In the figures, two screws 34 connect the center piece 30 to the main body 12, and each arm 14 is adapted to pivot (e.g., in a horizontal plane) on a pin 134 anchored to the main body and/or to the center piece. The illustrated center piece 30 is a generally plate-like body having a generally T-shaped cross-sectional configuration, as can be appreciated in FIG. 2. These details, however, are by no means limiting to the invention. For example, the center piece 30 is strictly optional and can be omitted.

Springs 32 can be provided to resiliently bias the arms in the described manner. In the figures, a spring 32 is positioned between the rear end region of each arm 14 and a shoulder of the center piece 30. Alternatively, the spring 32 could be positioned between a shoulder of the main body 12 and the arm 14. Other arrangements could also be provided to resiliently bias the arms 14 in the described manner.

The illustrated punch-retention arms 14 each have a tapered front end region. This, however, may not be the case in other embodiments.

Preferably, the die-retention arms 16 are also mounted to the main body 12 such that these two arms have a limited range of movement toward and away from each other. In preferred cases, these arms 16 are resiliently mounted (e.g., pivotally) to the main body 12 such that the arms are resiliently biased toward a default configuration characterized by the arms being closer to each other than they are in any other configuration within their limited range of movement.

The illustrated die-retention arms 16 are attached pivotally to the main body 12 using screws 38 or other suitable fasteners. Here, the screws 38 are inserted through respective openings OP in the arms 16. The leading ends of these screws 38 are anchored into a lower portion 12c of the main body. Each arm 16 pivots about a central portion of the screw 38. A spring 40 is positioned between each arm 16 and a shoulder of the main body 12. Of course, other arrangements could also be provided to resiliently bias the arms 16 in the described manner.

Thus, the figures are representative of a broader group of embodiments wherein each die-retention arm 16 is pivotally moveable (optionally, about a pivot point defined by a screw 38) toward and away from its default position (i.e., the position toward which the spring 40 pushes the arm 16).

In the illustrated embodiments, a handle 24 is provided on the cartridge 10 to facilitate carrying the cartridge manually. The handle 24 can be attached (optionally removably) to the center piece 30 and/or to the main body 12. Alternatively, the handle can be integral to the center piece and/or to the main body. As another alternative, the handle can actually be omitted, if so desired. In the present embodiments, the optional handle 24 is attached to the center piece 30 by a screw 26.

An upper horizontal alignment pin 36 can optionally be provided (e.g., it can be mounted to the center piece 30 and/or to the main body 12). In the figures, this pin 36 (which can optionally be formed of metal and/or have a circular cross section) is positioned directly between the two punch-retention arms 14.

A vertical alignment pin 28 can optionally be provided on each punch-retention arm 14. Each illustrated pin 28 is mounted (e.g., so as to have its axis extending vertically) in an opening defined by a front end region (which defines the outwardly-extending free end) of an arm 14. The illustrated vertical pins 28 each have a circular cross section, although this is not required. Each arm 14 preferably lies in a horizontal plane, and each pin 28 preferably extends along a vertical axis. In other embodiments, though, the pins 28 may be omitted or configured in a different fashion.

The illustrated cartridge also includes two lower horizontal alignment pins 20. These pins 20 preferably are spaced apart and at least generally parallel to each other. The pins 20 are shown as being generally parallel to the punch-retention arms 14 and to the die-retention arms 16, although this may not be the case in other embodiments. The pins 20 optionally have a circular cross section (other shapes are possible) and preferably are formed of metal. The pins 20 also preferably are located between (e.g., directly between) the two die-retention arms 16. The pins 20 desirably are rigidly mounted to the main body, e.g., so as to have no freedom of movement relative to the main body.

Figure 22:
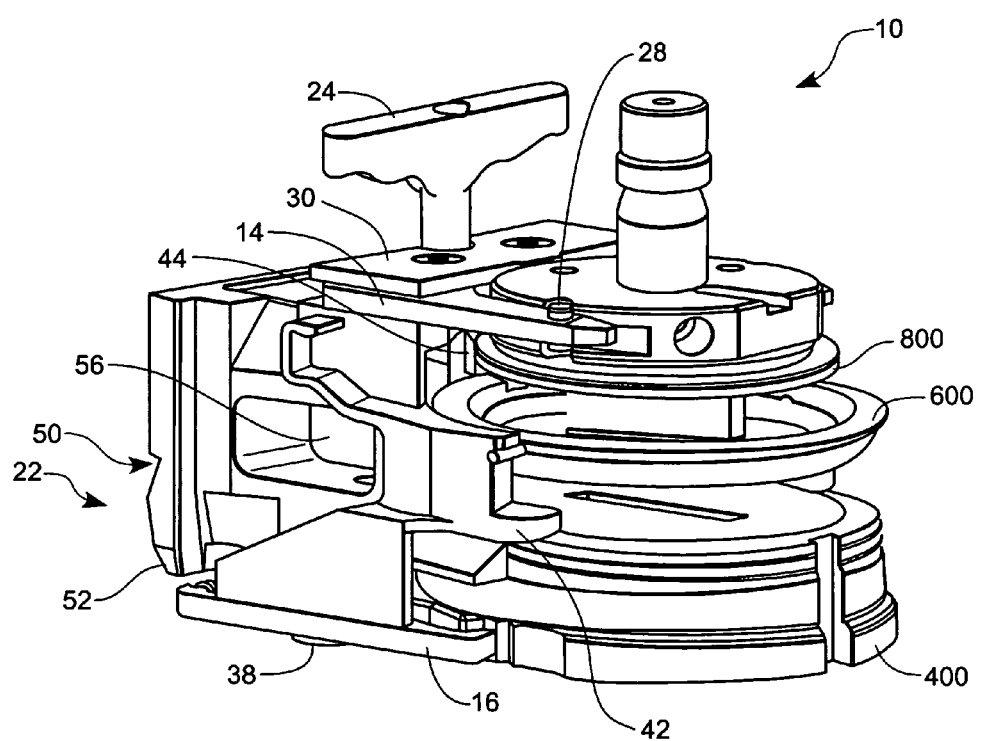
FIG. 22 is a perspective view of a cartridge carrying a tool set in accordance with certain embodiments of the invention.
Figure 24:
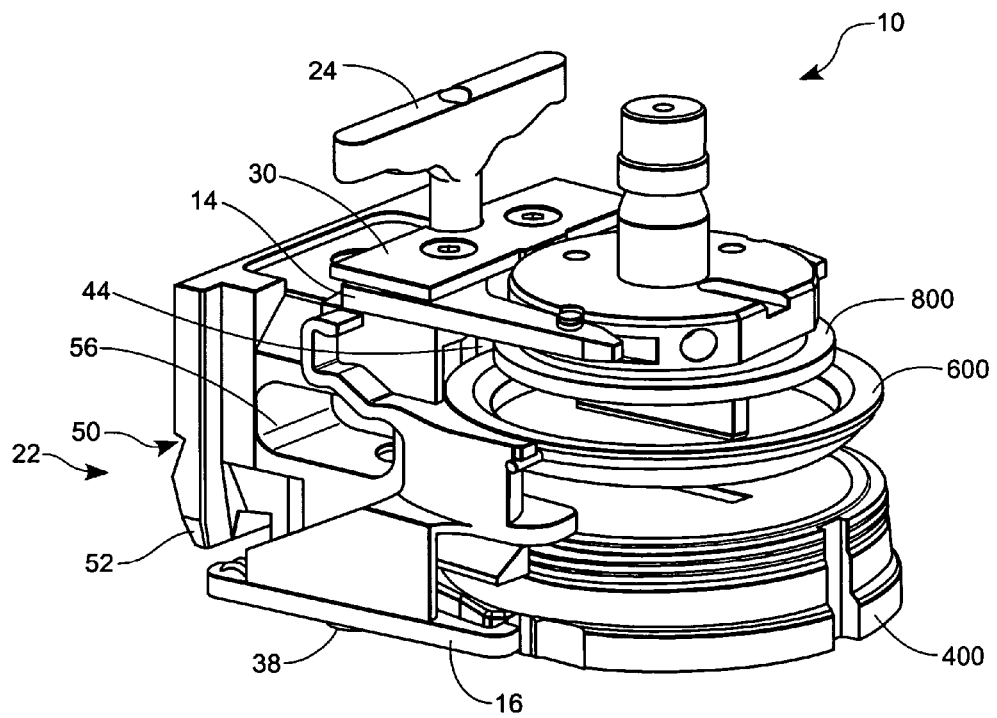
FIG. 24 is a perspective view of a cartridge carrying a tool set in accordance with certain embodiments of the invention.

A stripper locator base 18 is provided at a middle portion 12b of the cartridge (e.g., optionally at a middle portion of the main body). The stripper locator base 18 is located between the punch-retention arms 14 and the die-retention arms 16. In the figures, the stripper locator base 18 comprises a single, integral piece defining two spaced-apart arm portions 42. The illustrated arm portions 42 are not mounted resiliently for movement relative to the main body 12, but rather are rigidly disposed relative to the main body so as to have no freedom of movement (or at least substantially no freedom of movement). The stripper locator base 18 desirably defines a shelf 215 (having at least one curved portion), and perhaps optimally having at least two curved portions) that is adapted to receive a partial extent (e.g., a partial circumferential extent) of a stripper plate 600 having a circular configuration. This is perhaps best appreciated with reference to FIGS. 22 and 24, which show a loaded cartridge (i.e., a cartridge carrying a tool set). The shelf 215 preferably has a horizontal surface on which a stripper plate 600 can be supported.

In the illustrated embodiments, the stripper locator base 18 also defines a generally arc-shaped surface 420, which preferably is a horizontal surface. This surface 420 desirably is spaced (e.g., vertically) from the shelf 215. The surface 420 can optionally be defined by a rim that is a projection of the stripper locator base, as shown. The bottom front edge of the illustrated rim has an angled chamfer 424. In some cases, the chamfer 424 is angled at between about 30 degrees and 60 degrees, such as about 45 degrees. This chamfer allows clearance for forming tools with taller die caps. The rim can optionally define an arc that extends at least about 145 degrees, with a bottom edge region (which faces generally downwardly, i.e., toward the die-retention arms) of this arc being chamfered. The invention provides certain embodiments wherein the cartridge has this chamfer feature regardless of any particular restrictions on what materials the main body, arms, etc. are formed of, and regardless of whether the stripper locator base or the rail-engagement portion are removable, and regardless of the weight of the cartridge. For example, some embodiments involve simply providing this chamfer on a conventional cast iron or plastic cartridge to allow clearance for forming tools with higher die caps.

The illustrated stripper locator base 18 defines a groove bounded by at least one semi-circular wall section 185, although these features are not strictly required.

In the embodiment of FIGS. 1-7, a middle portion 12b of the main body 12 defines the stripper locator base 18. That is, the stripper locator base 18 is part of (i.e., integral to) the main body 12. On the other hand, in the embodiments of FIGS. 8-14 and FIGS. 15-21, the stripper locator base 18 is removably attached to the main body 12, such that the stripper locator base 18 can be removed and replaced, e.g., if damaged or worn. In embodiments of this nature, platforms 62 are provided for receiving rear portions (e.g., rear flange portions) 64 of the stripper locator base 18. The platforms 62 preferably are mateable with (e.g., correspondingly configured to nestingly receive) the rear portions 64 of the stripper locator base such that these rear portions 64 can be fitted snugly against the platforms 62. Likewise, a platform 66 is provided for receiving the bottom of the stripper locator base. The platform 66 can optionally have a size and shape that corresponds to the size and shape of the bottom of the stripper locator base.

In the exemplary embodiments of FIGS. 8-21, the stripper locator base 18 is removably attached to the main body using at least one fastener (e.g., a screw) 68. Each illustrated fastener 68 extends through an opening defined by the platform 66 and through a corresponding opening defined by the stripper locator base 18. Here, each fastener is an exteriorly threaded screw and the openings through which it extends are interiorly threaded. Other arrangements for removably attaching the stripper locator base can alternatively be used.

Figure 25:
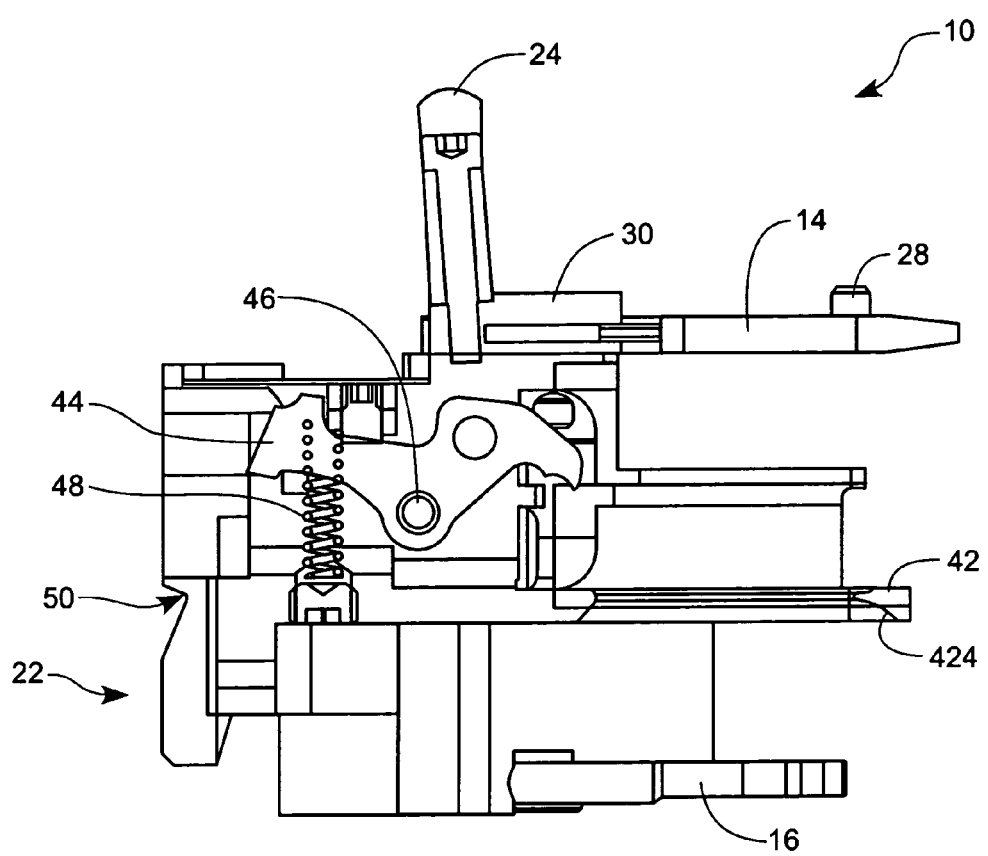
FIG. 25 is a side cross-sectional view of a cartridge in accordance with certain embodiments of the invention.

An optional stripper plate holder 44 can also be provided. This can be seen best in FIG. 25 and also in FIGS. 2, 6, 7, and 22. The illustrated holder 44 is mounted to the cartridge's main body, e.g., by a pin 46. Here, the holder 44 has a front portion and a rear portion. Preferably, the holder 44 is mounted pivotally on the pin 46, such that the holder has some freedom of pivotal movement. The rear portion of the illustrated holder 44 is resiliently biased upwardly using a spring 48 or another resilient member. This causes the front portion of the pivotally mounted holder 44 to be resiliently biased downwardly. When a stripper plate is loaded onto the shelf 215, a top portion of the stripper plate cams with and bears upwardly against the front portion of the holder 44, which causes the holder 44 to pivot such that its front portion is moved upwardly somewhat to give the stripper plate clearance to be pushed fully onto the shelf 215. Since the front portion of the holder 44 is resiliently biased downwardly, the holder 44 then presses downwardly on the stripper plate, thereby holding the stripper plate securely in place (e.g., such that the stripper plate is held forcibly between the holder 44 and the shelf 215).

Figure 23:
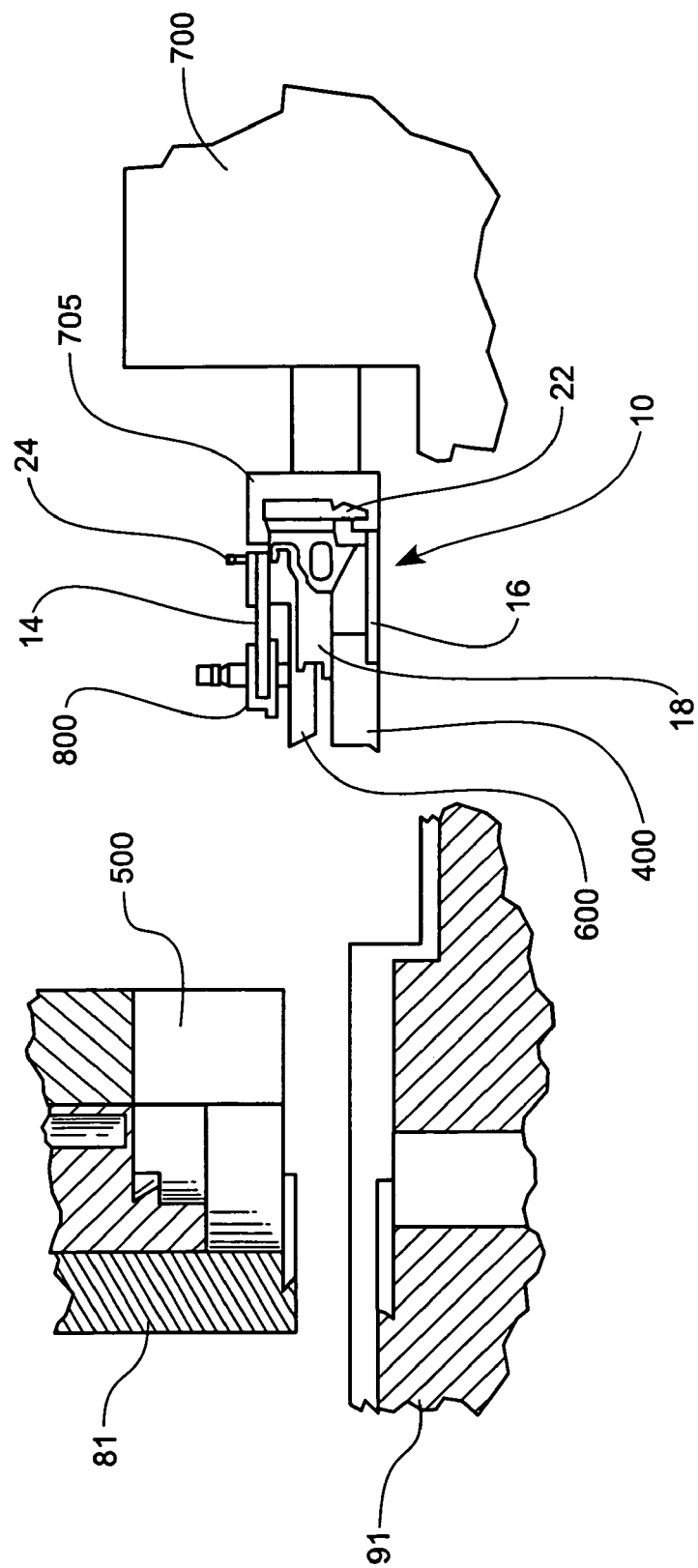
FIG. 23 is a schematic partially-sectional view of a tool mounting position of a machine tool's ram, showing a loaded cartridge supported on a guidance system in accordance with certain embodiments of the invention.

The cartridge 10 also includes a rail-engagement portion 22. The rail-engagement portion 22 is adapted to be attached to a rail (and/or to a mount body 705 of a guidance system 700) of a machine tool. This is perhaps best understood with reference to FIG. 23. By virtue of this attachment, the cartridge 10 can be moved selectively toward or away from a tool mounting position 500. In FIG. 23, items 81 and 91 are upper and lower portions, respectively, of the machine tool. The rail-engagement portion 22 of the cartridge 10 preferably is located on a rear portion of the cartridge (optionally on a rear portion of the cartridge's main body). For example, the illustrated rail-engagement portion 22 is located on (i.e., is part of, or is attached to) a rear, lower region of the cartridge's main body.

The rail-engagement portion 22 preferably defines an outwardly open notch 50. This notch 50 is shown as being at least generally V-shaped, although other notch configuration may also be useful.

In the embodiments of FIGS. 1-14, the rail-engagement portion 22 is integral to the cartridge's main body 12. On the other hand, in the embodiments of FIGS. 15-21, the rail-engagement portion 22 comprises at least one rail-engagement insert that is removably mounted to a rear portion of the cartridge's main body 12. Each such insert can be removably mounted to the cartridge's main body 12 using a screw 70 or another removable fastener. In embodiments of this nature, the rail-engagement insert(s) 22 can be selectively removed and replaced, e.g., if damaged or worn. As is perhaps best shown in FIGS. 15 and 16, the insert itself defines the notch 50 in some embodiments.

In certain embodiments, the main body 12 of the cartridge is formed of one material (e.g., a first metal, optionally an aircraft metal) while the punch-retention arms 14 and die-retention arms 16 are formed of different material(s), optionally a different metal or metals (e.g., the punch-retention arms 14 and the die-retention arms 16 can all be formed of a second metal, or the punch-retention arms 14 can be formed of a second metal while the die-retention arms 16 are formed of a third metal). In some cases, the punch-retention arms 14 and the die-retention arms 16 are formed of the same material (e.g., steel), and the main body 12 is formed of a different material (e.g., beryllium, titanium, magnesium, or aluminum). In other cases, the punch-retention arms 14 are formed of a first material, the die-retention arms 16 are formed of a second material, and the main body 12 is formed of a third material (i.e., where the first, second, and third materials are all different from one another). In any embodiment described in this paragraph, the arms 14, 16 can be provided with a coating (of any type described below), while the main body is provided either with a different coating or no coating.

In some embodiments, the main body 12 comprises (e.g., is formed of) metal. The main body, for example, can advantageously be devoid of plastic (perhaps optimally, the entire cartridge has no plastic parts). In some cases, the main body 12 is formed of an aircraft metal. The aircraft metal can be selected from the group consisting of beryllium, titanium, magnesium, aluminum, and alloys comprising one or more of beryllium, titanium, magnesium, and aluminum. In some embodiments of this nature, steel is used to form the punch-retention arms 14 and/or the die-retention arms 16.

In one group of embodiments, the main body 12 is formed of a composite material. The composite material can optionally comprise carbon fiber. One useful composite is a ceramic composite, such as a Kevlar ceramic composite. In some cases, the composite material comprises at least one metal and at least one non-metal. In certain embodiments, the main body 12 comprises (e.g., is formed of) a composite, and the cartridge includes at least one removable/replaceable stripper locator base insert and/or one or more other removable/replaceable wear-reducing inserts (optionally one, two, or more removable inserts at a cartridge-to-rail attachment point).

The punch-retention arms 14 and die-retention arms 16 can advantageously comprise (e.g., be formed of) steel. The punch-retention arms are repeatedly engaged and disengaged with a punch (such as punch 800 depicted in FIGS. 22-24), and the die-retention arms are repeatedly engaged and disengaged with a die (such as die 400 depicted in FIGS. 22-24). Therefore, these portions of the cartridge experience a high degree of wear. Accordingly, they are more prone to being damaged than other parts of the cartridge. To account for this, it is desirable to fabricate these arms of steel or another high strength and/or wear resistant metal.

In certain embodiments, the main body (or at least a portion thereof) is provided with a coating. The coating can be adapted to increase the surface hardness of the material from which the body 12 is formed and/or to otherwise help protect it against wear, corrosion, friction, sticking, and/or galling.

In one group of embodiments, at least a portion of the main body 12 is coated with a dry lubricant coating. The coating, for example, can comprise nickel (e.g., nickel alloy) and/or a low friction polymer. The coating can be applied over the main body (this is particularly advantageous when the main body comprises aluminum or another light weight metal) such that the resulting coated surface has one or more of the following features: (i) a coefficient of static friction below 0.35, below 0.3, or even below 0.2; (ii) a coefficient of dynamic friction below 0.3, below 0.25, below 0.18, or even below 0.1. Such coefficients can additionally or alternatively be provided on surfaces of the arms 14, 16 by using such a dry lubricating coating. Useful dry lubricant coatings are available, for example, from General Magnaplate Corporation (Linden, N.J., USA) and Poeton Industries, Ltd. (Gloucester, England). As one example, the main body 12 (i.e., all or a portion thereof) can be coated with a NEDOX® coating. NEDOX® coatings can be provided to increase the wearlife of the main body and/or to provide a nonbonding surface that reduces buildup of materials. NEDOX® coatings can also be provided to create a smooth and slippery surface, which can help reduce friction.

In other embodiments, the main body 12 (i.e., all or a portion thereof) is coated with a coating comprising aluminum (e.g., aluminum oxide) and/or fluorocarbon polymers, such as a hard anodized composite coating. In some cases, the coating is a TUFRAM® coating. These coatings can be particularly advantageous when the main body 12 comprises aluminum or an aluminum alloy. These coatings, for example, can be provided to increase surface hardness and/or to prevent abrasive wear and galling. These coatings are also self-lubricating so they can reduce friction. TUFRAM® coatings are available from General Magnaplate Corporation as well.

In some embodiments, the main body 12 of the cartridge 10 is provided with a surface treatment. For example, the main body 12 can optionally comprise aluminum that has been anodized. Anodizing is an electro-chemical process that converts the surface of raw aluminum to an oxide coating. Anodizing enhances the abrasion resistance and corrosion resistance of the aluminum surface.

In other embodiments, the cartridge's main body is provided with a coating comprising a nitride and/or a carbide. One commercially available nitride coating is the Nitrex® coating, which is a high endurance surface enhancement available from Nitrex, Inc. (Aurora, Ill., USA). Nitrex surface enhancements impart lubricity characteristics in a metal surface to significantly lower the friction coefficients of the surface. This surface treatment can be provided, for example, to increase durability and/or to reduce galling. Particularly useful nitriding and nitrocarburizing enhancements are described in U.S. Pat. No. 6,327,884, the entire teachings of which are incorporated herein by reference.

Thus, various coatings and/or surface treatments can be provided on the main body of the cartridge. Additionally or alternatively, the punch-retention arms 14 and/or the die-retention arms 16 can be provided with a coating or surface treatment. The coating or surface treatment can be any one of those already described with reference to the main body. It is particularly desirable, for example, to provide a coating (e.g., a dry lubricant coating) or surface treatment that reduces friction between the punch-retention arms and the punch, and/or between the die-retention arms and the die. Friction between these components is caused by repeated engagement and disengagement of the punch with the punch-retention arms and of the die with the die-retention arms.

In certain embodiments, a coating and/or surface treatment is provided on the main body 12 but not on the punch-retention arms 14 or the die-retention arms 16 (e.g., the main body 12 can be coated while the arms 14, 16 are uncoated). Alternatively (and perhaps more preferably), the punch-retention arms 14 and the die-retention arms 16 are provided with a coating and/or surface treatment that is not provided on the main body 12 (e.g., the arms 14, 16 can be coated while the main body 12 is uncoated). In some cases, the main body 12 and the punch-retention arms 14 are both provided with coating and/or surface treatment, but the main body has a different coating and/or surface treatment than the punch-retention arms 14. For example, the main body 12 can optionally comprise anodized aluminum and the punch-retention arms 14 can have a high hardness coating and/or a dry lubricating coating.

In some embodiments, the stripper locator base 18 and/or the rail-engagement portion 22 are provided with coating(s). The stripper locator base is repeatedly engaged and disengaged with a stripper plate. Likewise, the rail-engagement portion is repeatedly engaged with a rail (and/or a guidance system). Thus, friction is created between these components, and providing a friction-reducing coating on one or both of these components can help reduce wear and tear on the coated portions.

Figure 5:
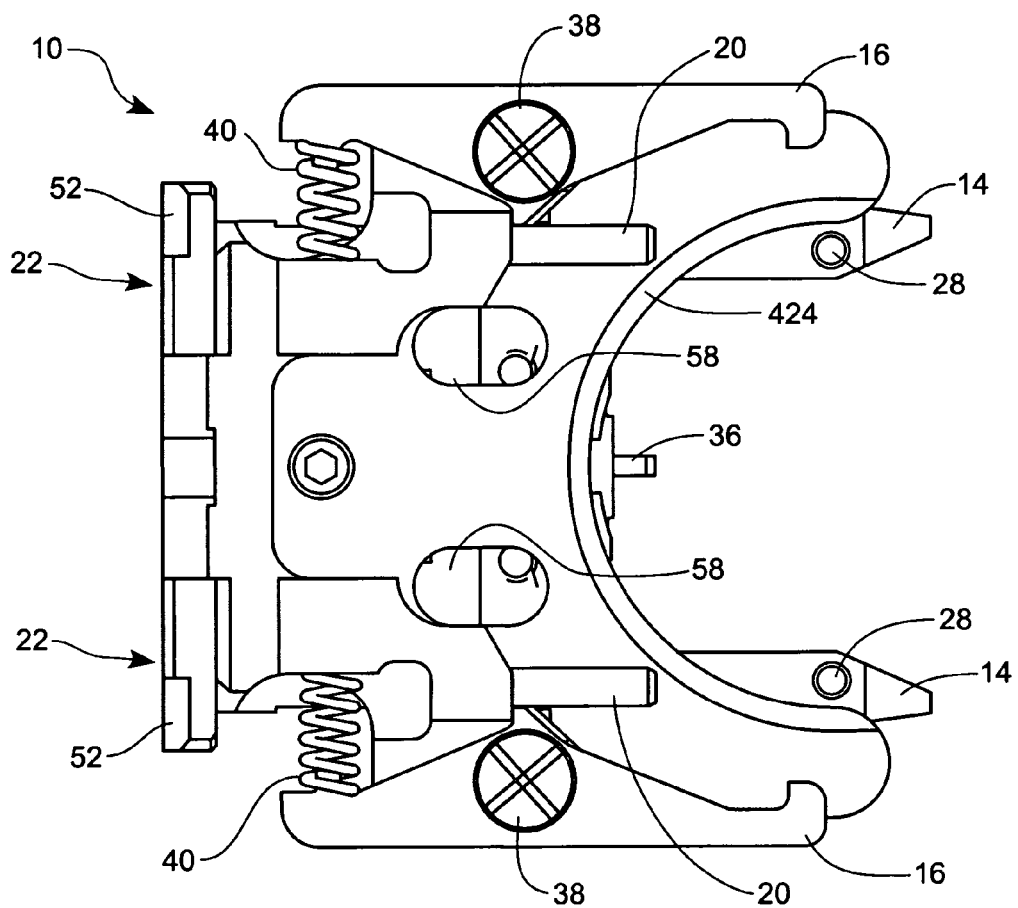
FIG. 5 is a bottom side view of the cartridge illustrated in FIG. 1.
Figure 6:
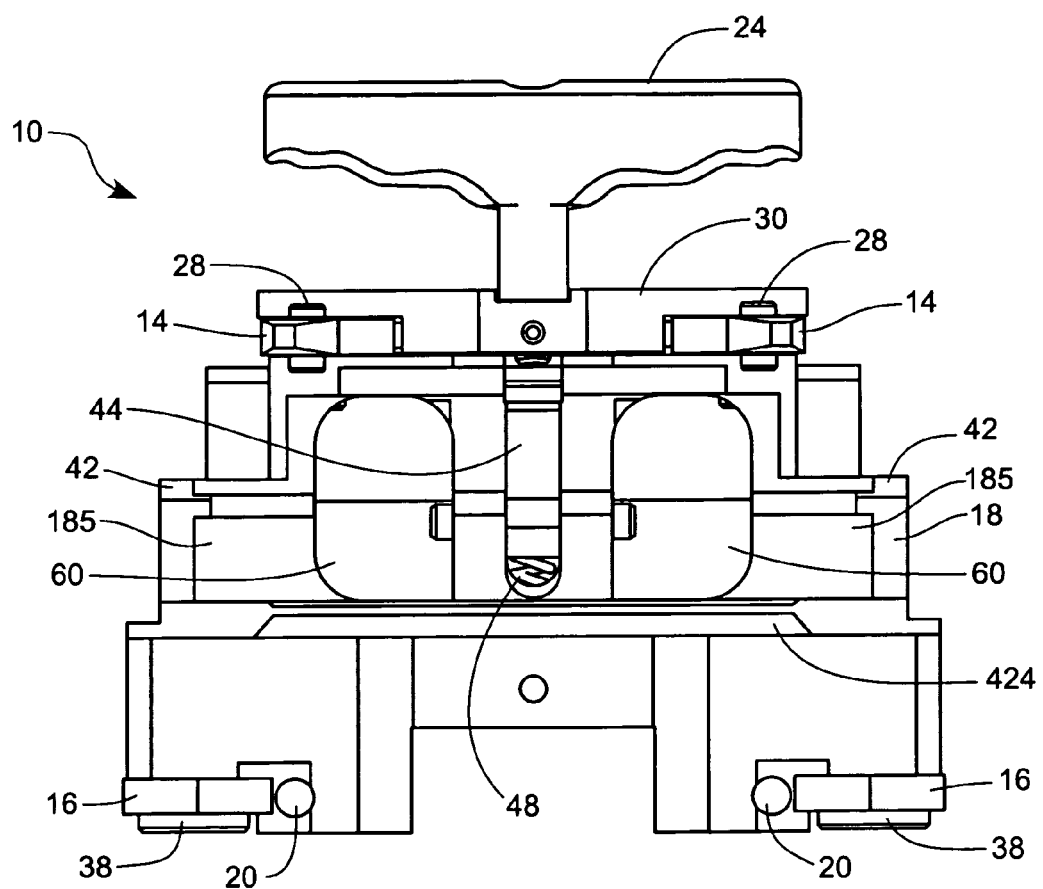
FIG. 6 is a front side view of the cartridge illustrated in FIG. 1.
Figure 7:
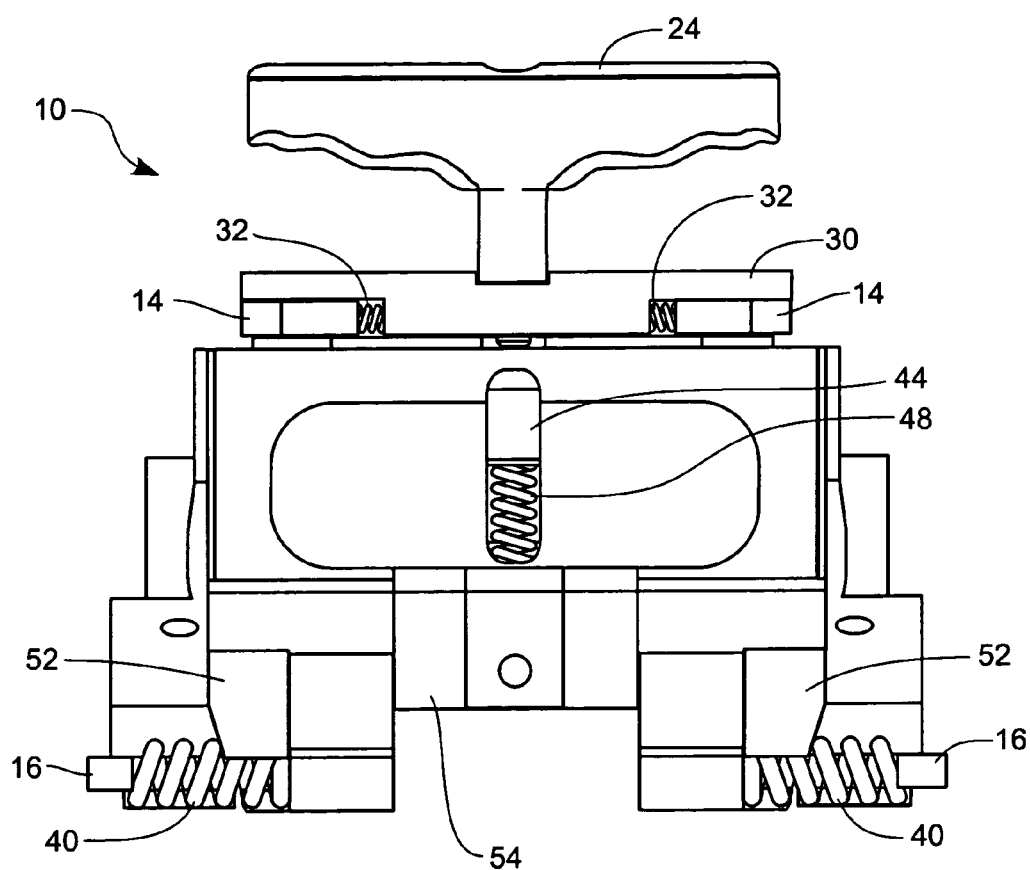
FIG. 7 is a back side view of the cartridge illustrated in FIG. 1.
Figure 8:
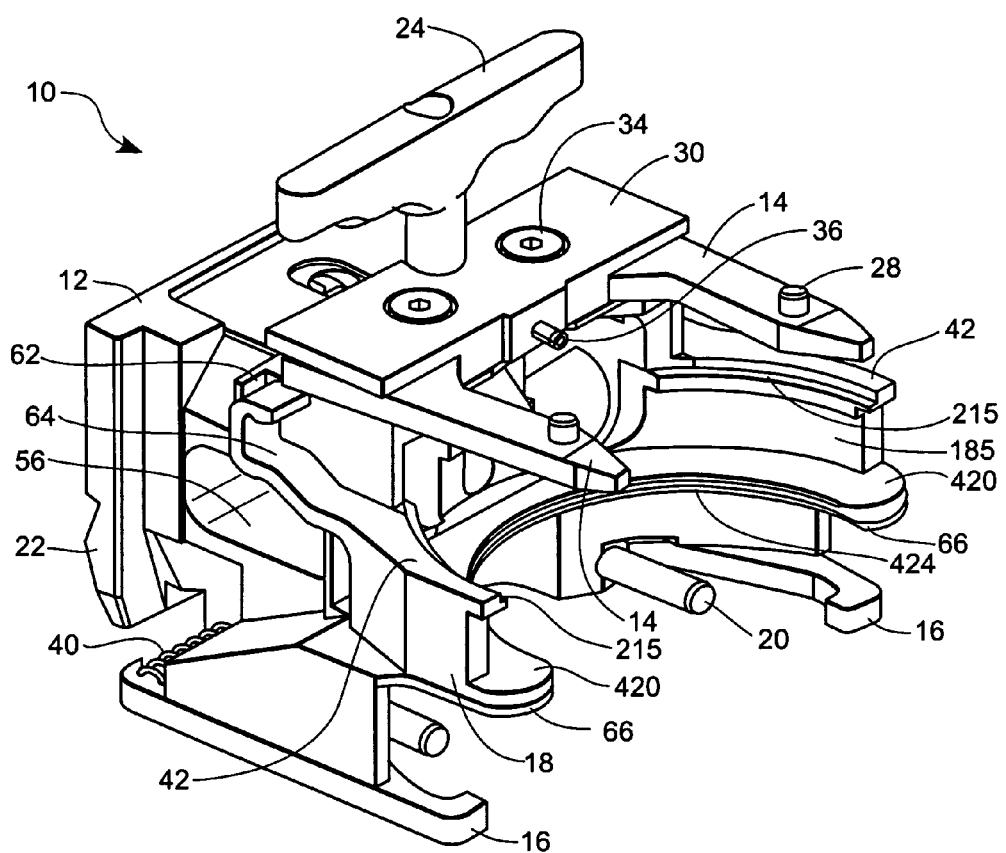
FIG. 8 is a perspective view of a cartridge according to a second embodiment of the invention.
Figure 9:
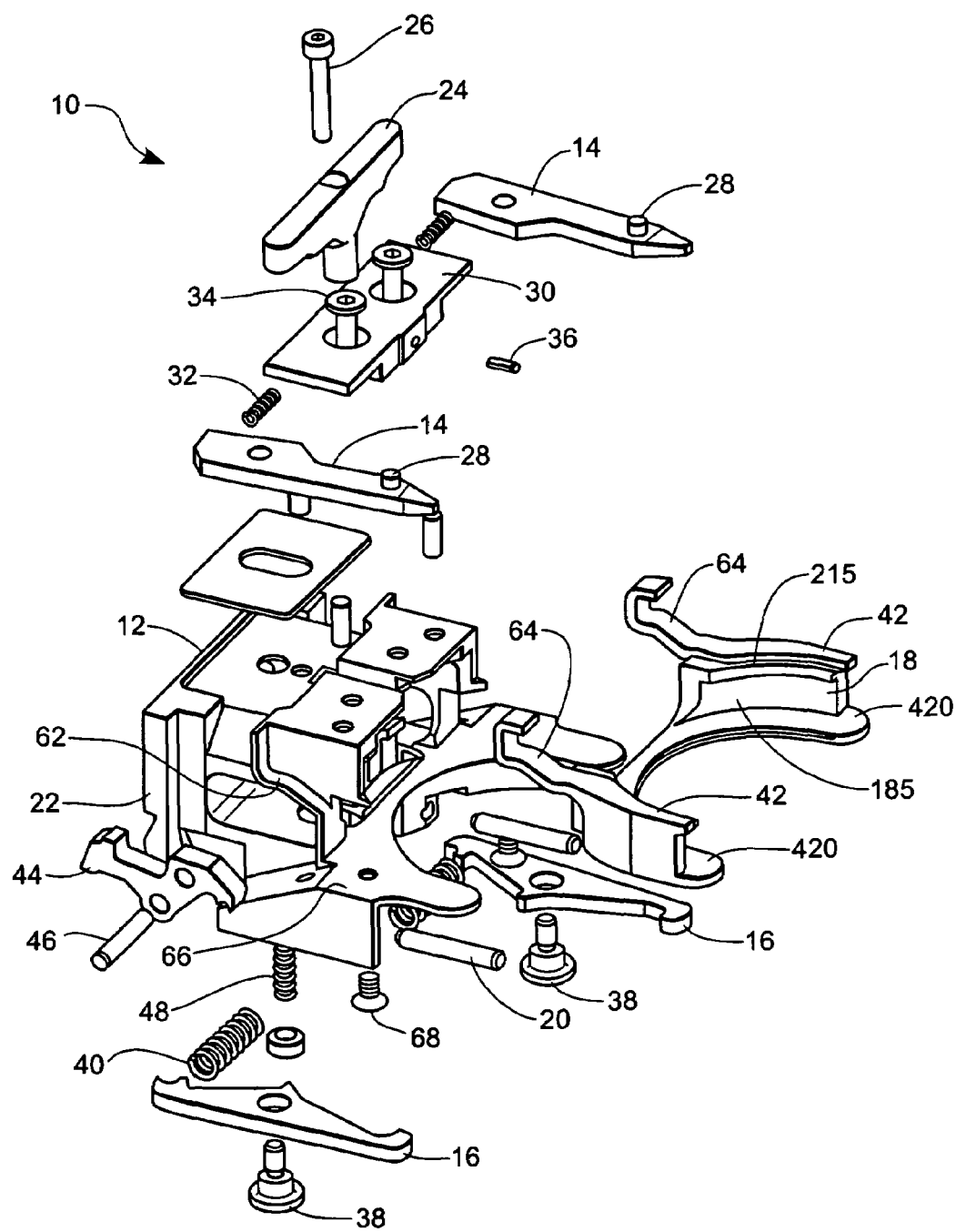
FIG. 9 is an exploded view of the cartridge illustrated in FIG. 8.
Figure 10:
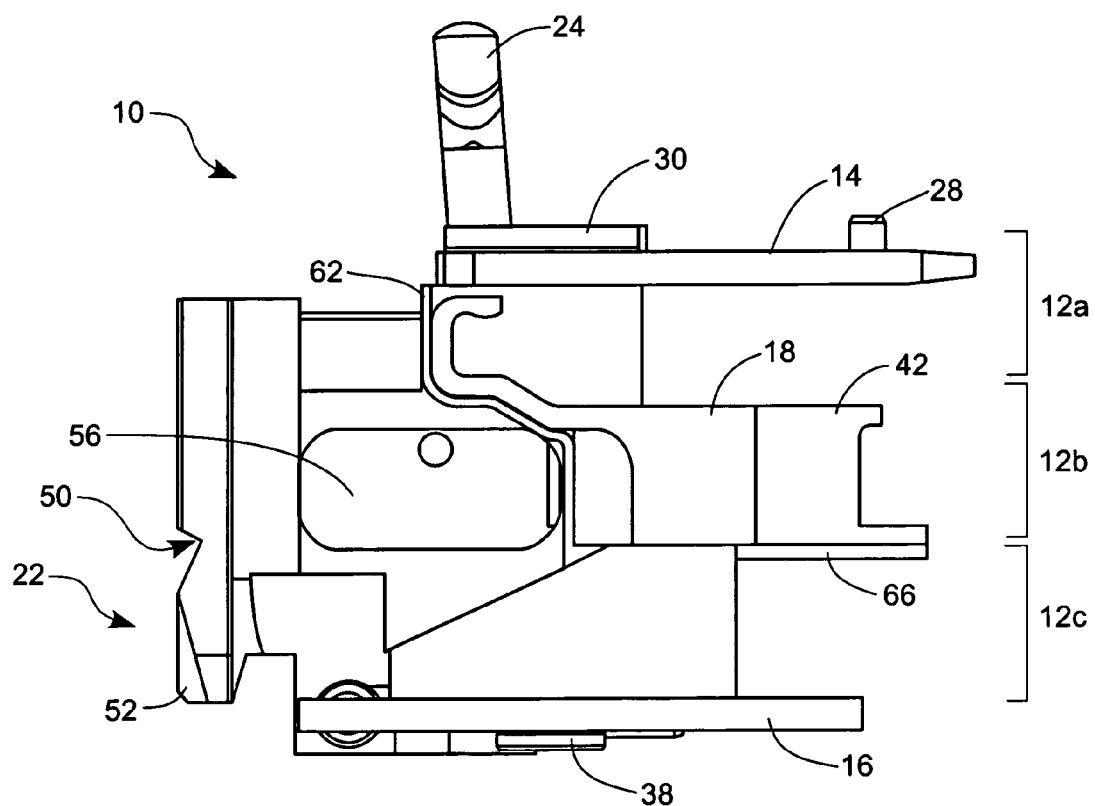
FIG. 10 is a right side view of the cartridge illustrated in FIG. 8.
Figure 10A:
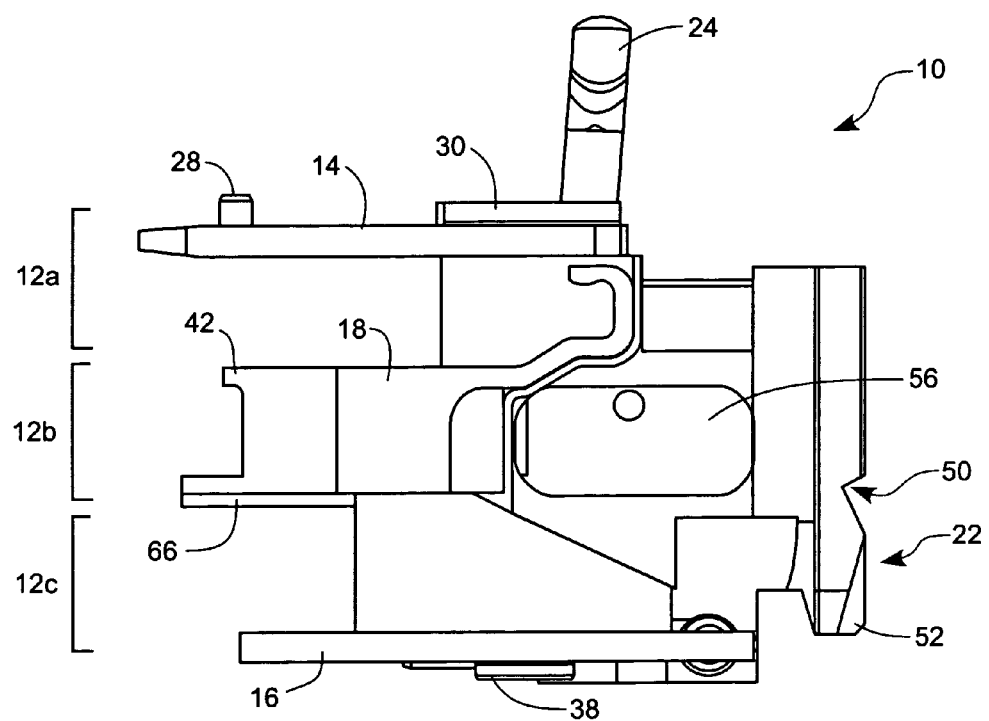
FIG. 10A is a left side view of the cartridge illustrated in FIG. 8.
Figure 11:
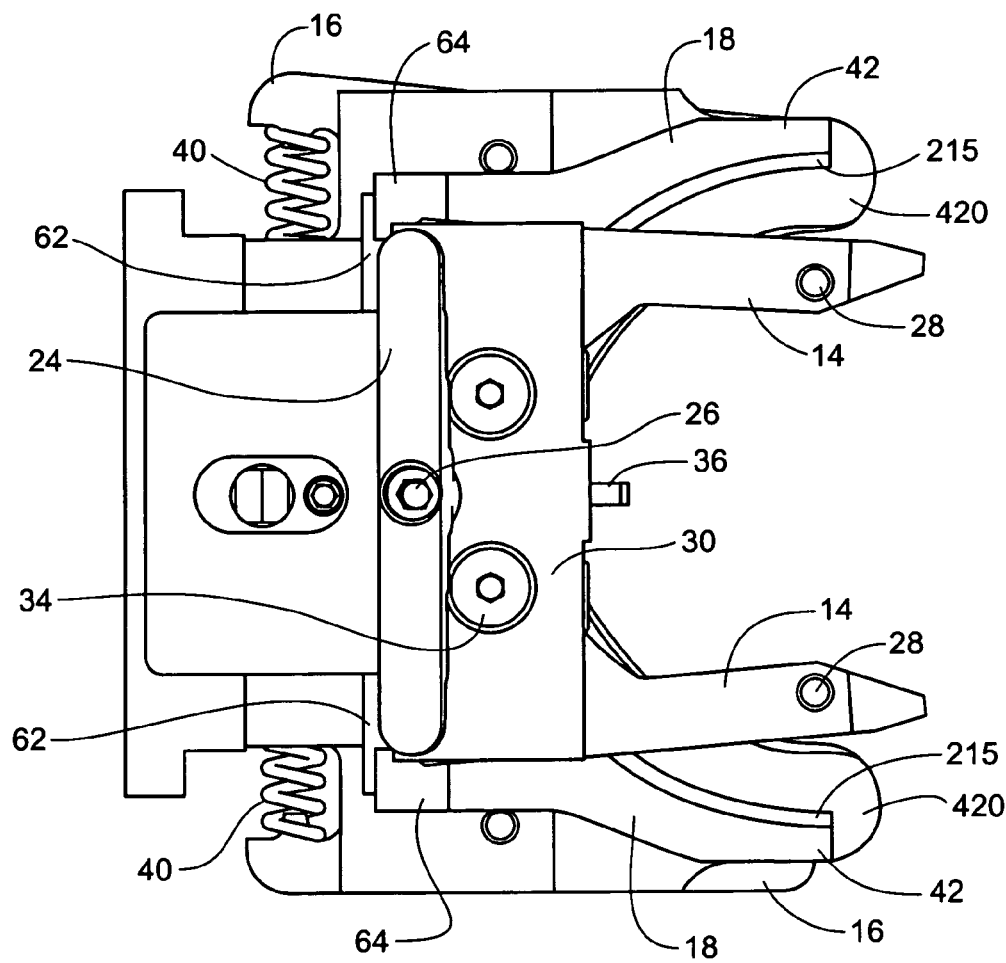
FIG. 11 is a top side view of the cartridge illustrated in FIG. 8.
Figure 12:
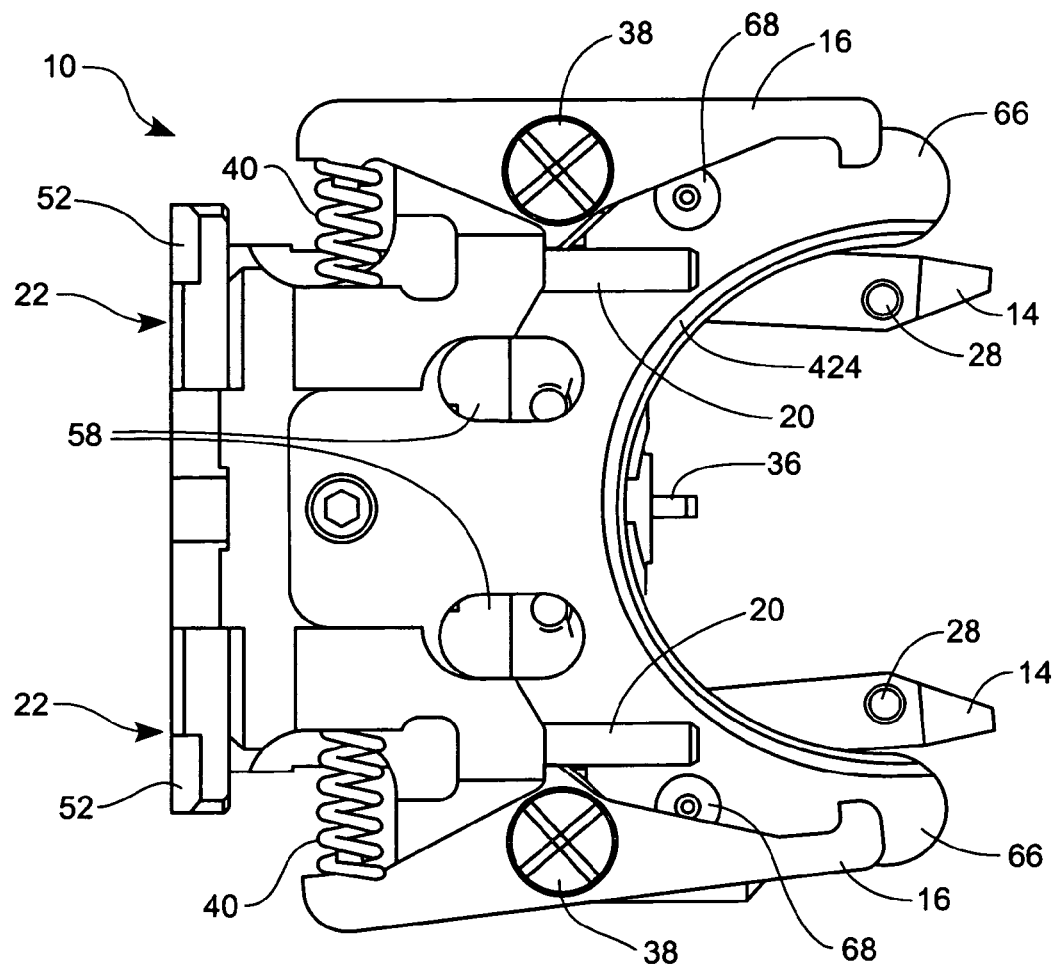
FIG. 12 is a bottom side view of the cartridge illustrated in FIG. 8.
Figure 13:
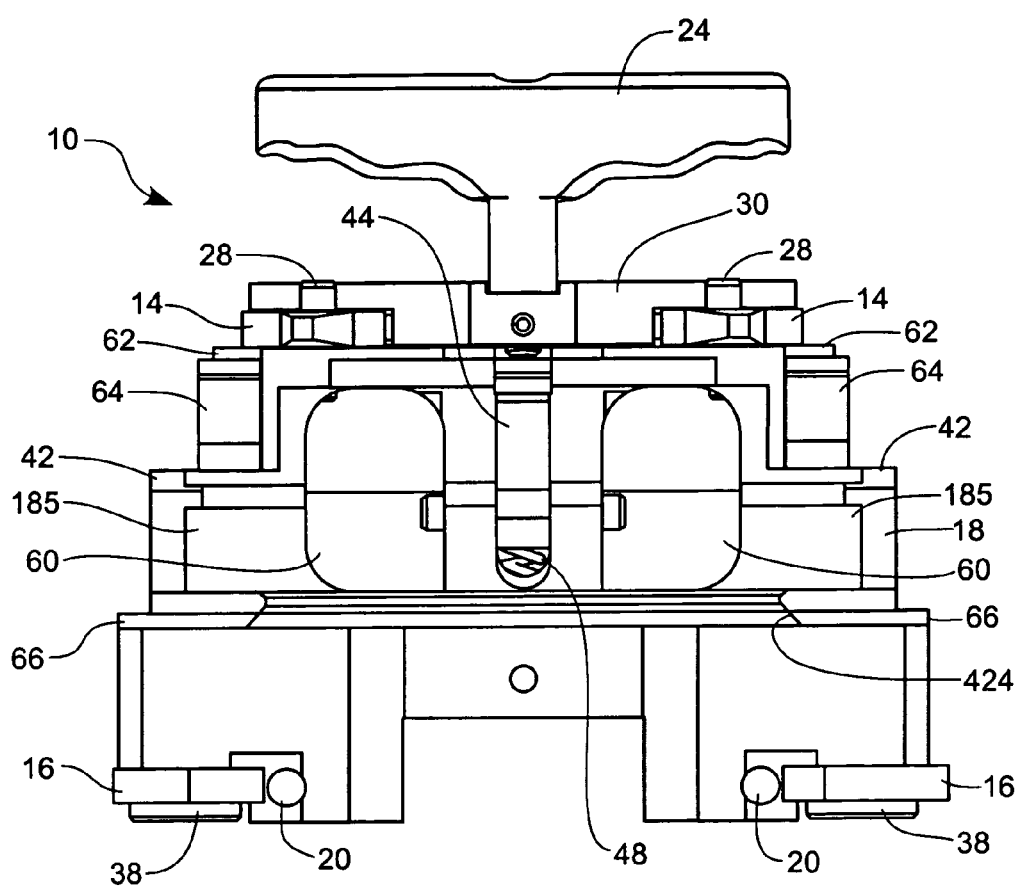
FIG. 13 is a front side view of the cartridge illustrated in FIG. 8.
Figure 14:
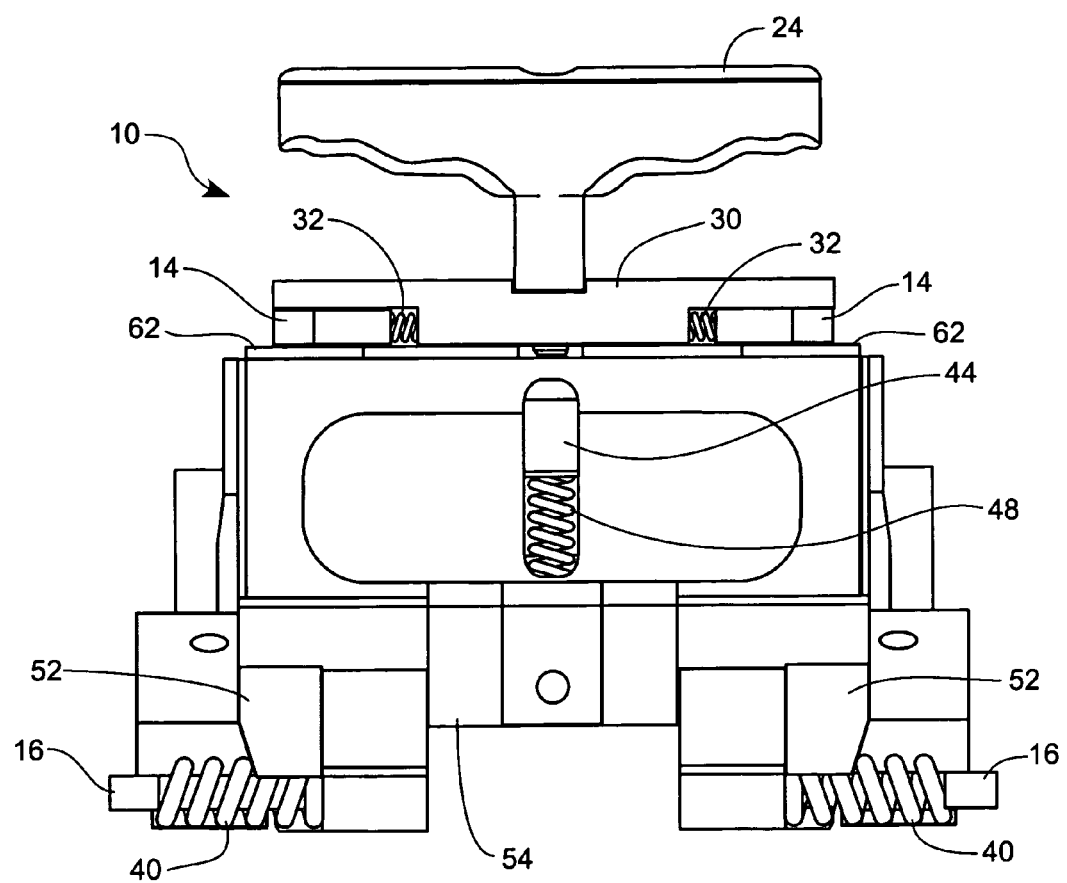
FIG. 14 is a back side view of the cartridge illustrated in FIG. 8.
Figure 15:
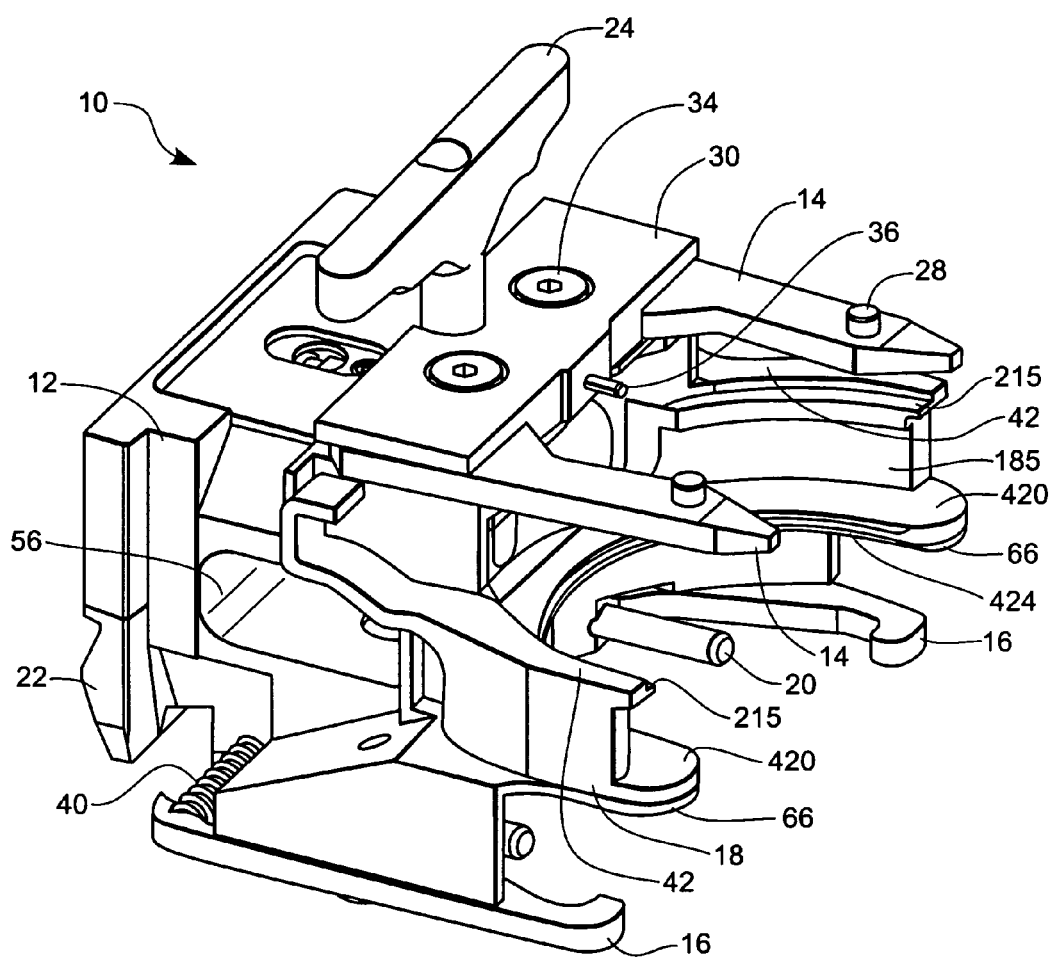
FIG. 15 is a perspective view of a cartridge according to a third embodiment of the invention.
Figure 16:
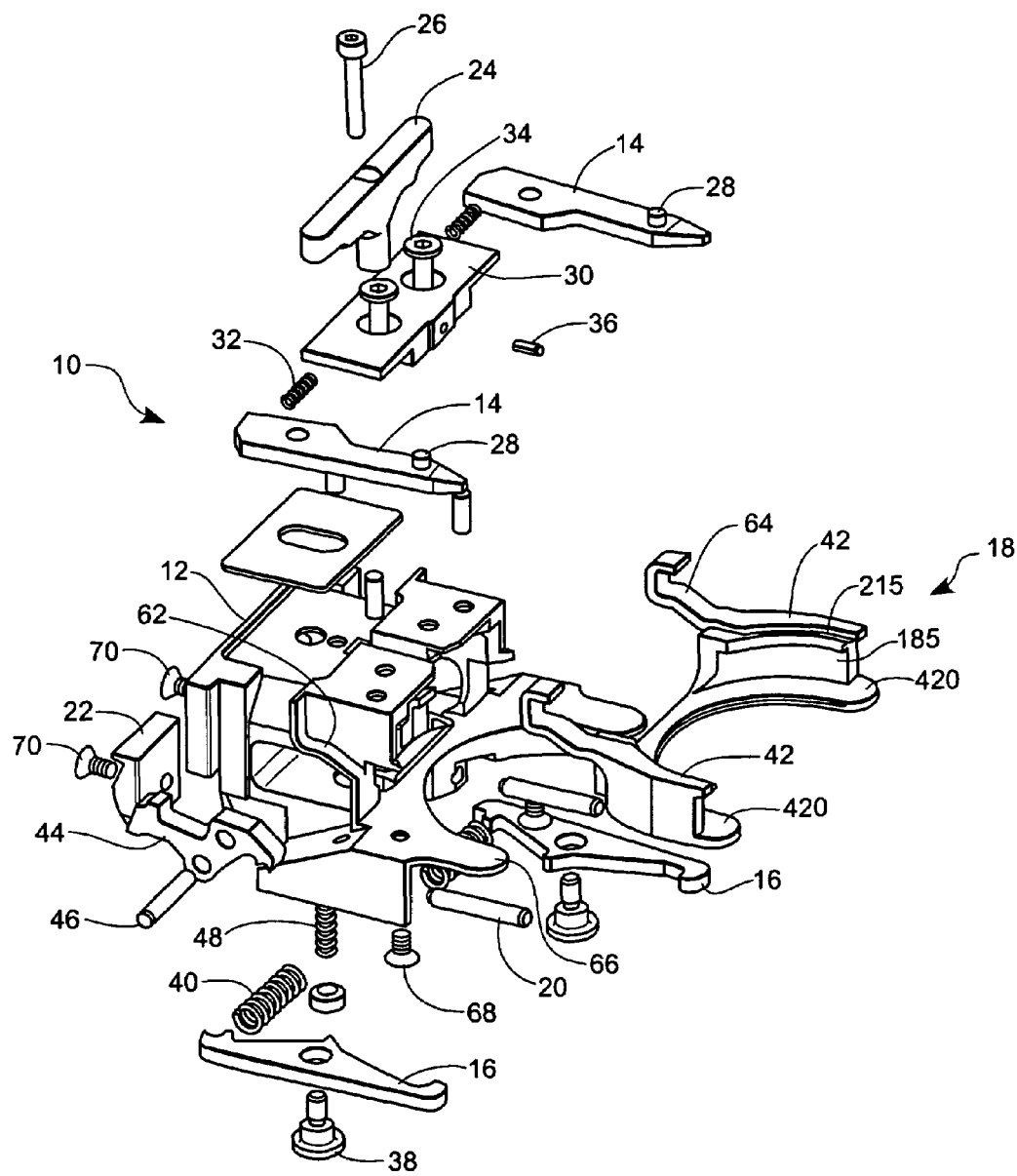
FIG. 16 is an exploded view of the cartridge illustrated in FIG. 15.
Figure 17:
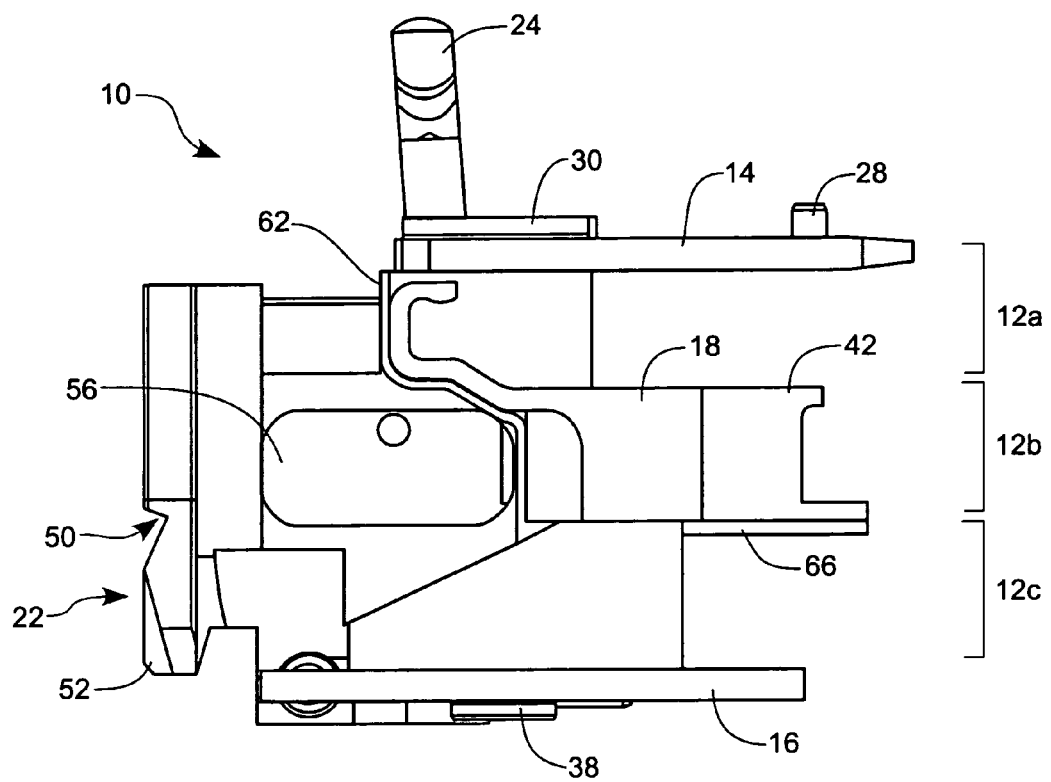
FIG. 17 is a right side view of the cartridge illustrated in FIG. 15.
Figure 17A:
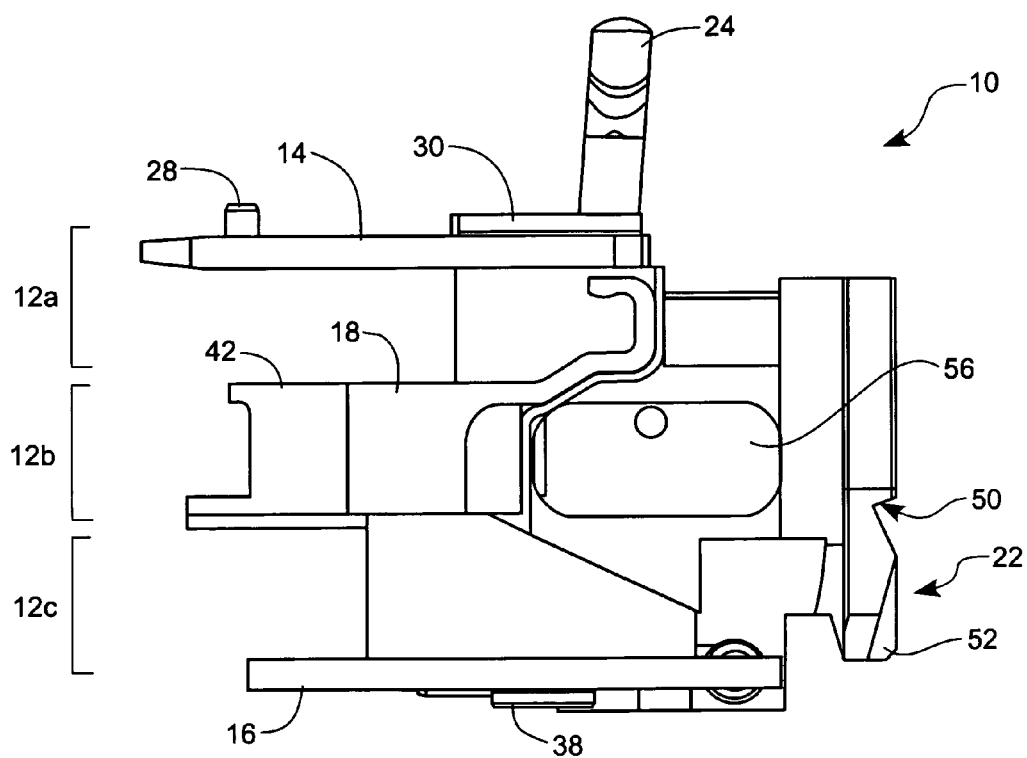
FIG. 17A is a left side view of the cartridge illustrated in FIG. 15.
Figure 18:
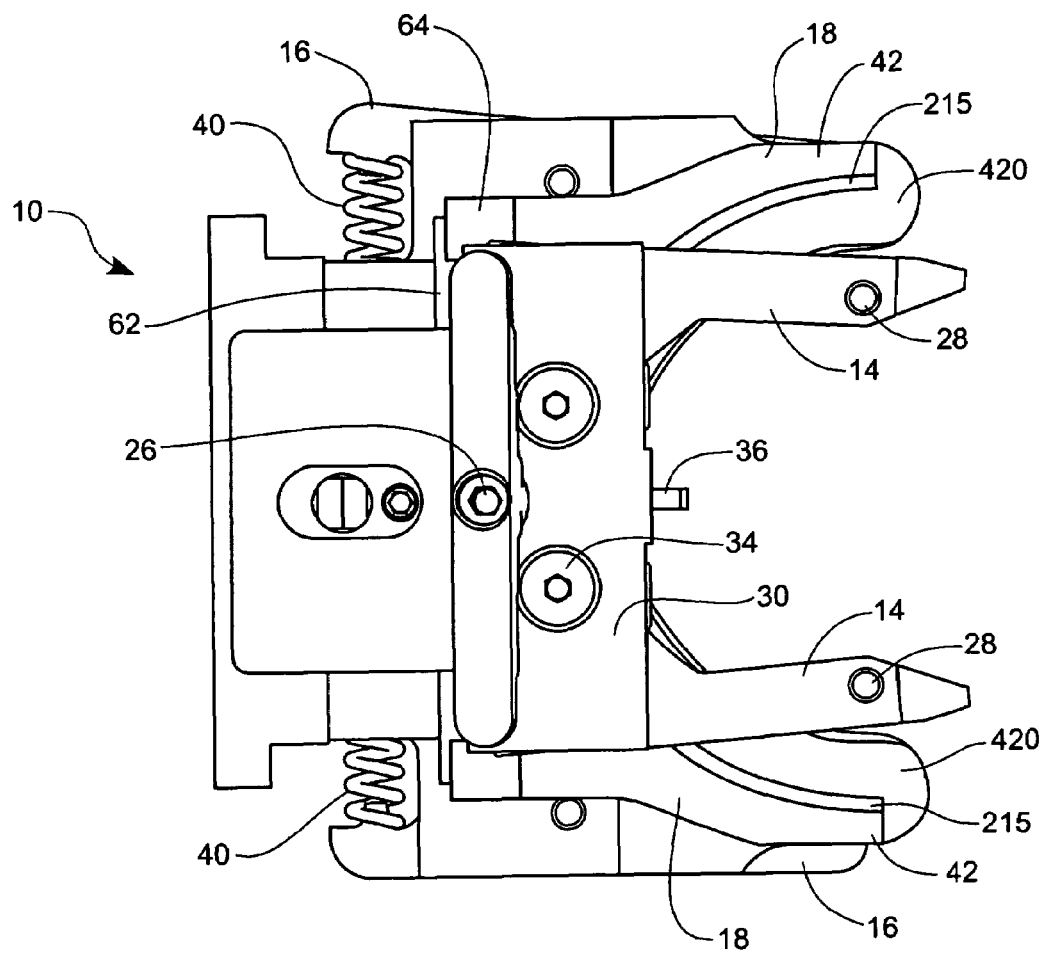
FIG. 18 is a top side view of the cartridge illustrated in FIG. 15.
Figure 19:
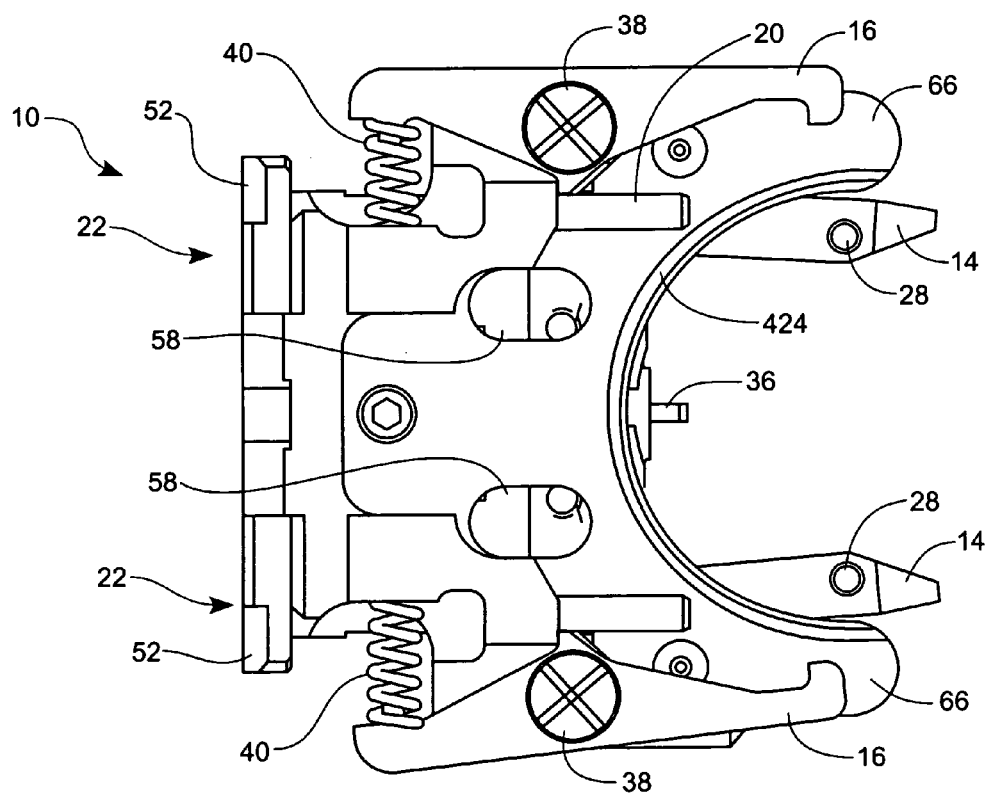
FIG. 19 is a bottom side view of the cartridge illustrated in FIG. 15.
Figure 20:
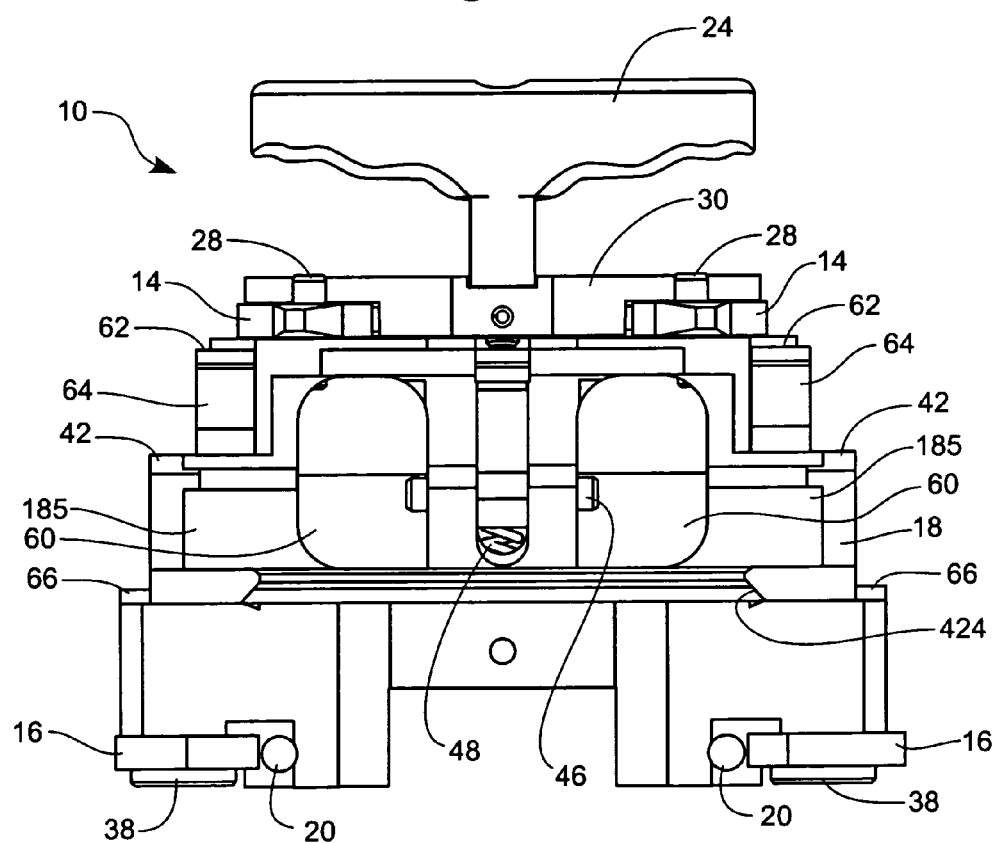
FIG. 20 is a front side view of the cartridge illustrated in FIG. 15.
Figure 21:
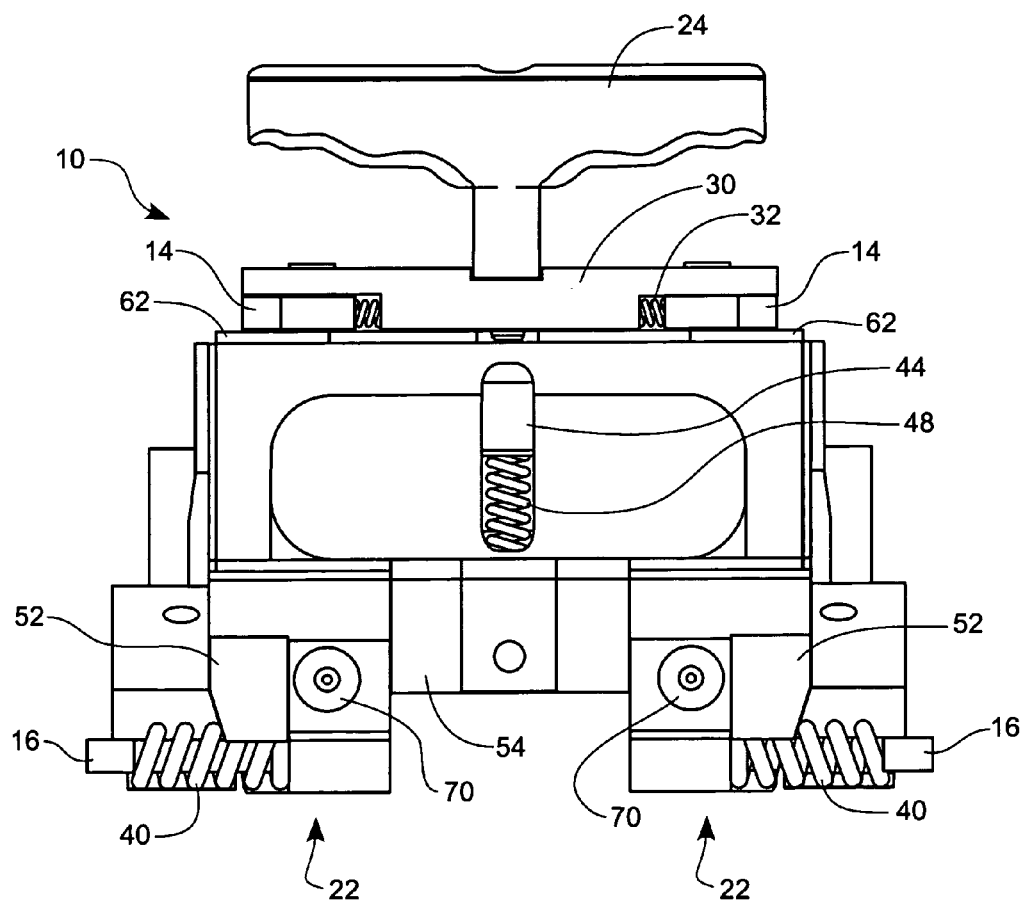
FIG. 21 is a back side view of the cartridge illustrated in FIG. 15.

One group of embodiments provides the cartridge in a particularly high durability, low weight configuration. Here, the main body 12 comprises (e.g., is formed of) a metal, optionally an aircraft metal. The main body has been shaped so as to achieve a surprising combination of low weight and durability. In these embodiments, the cartridge's main body can be (e.g., one or more of a bottom side, a front side, and each lateral side can be) provided with, for example, one or more pockets and/or openings that reduce the weight of the cartridge. This can be done in many different ways in keeping with the present embodiments. For example, each lateral side of the cartridge can be provided with at least one side pocket 56 (as best illustrated in FIGS. 1, 3, 8, 10, 15, and 17). Additionally or alternatively, the bottom of the cartridge can be provided with at least one bottom opening 58 (as best illustrated in FIGS. 5, 12, and 19). Further, the front of the cartridge can be provided with at least one front pocket 60 (as best illustrated in FIGS. 6, 13, and 20). In the illustrated pocket/opening embodiment, each of the front, side, and bottom pockets/openings 56, 58, 60 communicates with at least two of the others, such that when a person looks into one of these pockets/openings, they can see out at least two of the others. The illustrated design also includes a large back pocket, which is adjacent the rail-engagement portion 22. This illustrated pocket can optionally have a major dimension (e.g., a width) of at least two inches, at least 2.5 inches, or even 2.75 inches, and/or a minor dimension (e.g., a height) of at least 0.5 inch, at least 0.75 inch, or even at least 0.9 inch, and/or a depth of at least ⅛ inch, at least ¼ inch, or even at least ⅓ inch. In some embodiments, one or more of the pockets noted above has a depth greater than ½ inch, greater than ¾ inch, or even greater than 0.8 inch. Although the illustrated embodiment involves pockets/openings on the front, sides, bottom, and rear of the cartridge, other types of pockets/openings can additionally or alternatively be provided. The illustrated design achieves surprisingly low weight while at the same time providing excellent rigidity and exceptional agility, which is perhaps best appreciated by actually using the cartridge on a machine tool.

With reference to Table 1 below, the weights of seven different cartridges are provided. The tabulated weight is for the fully assembled (but unloaded—that is, not carrying a tool set) cartridge. Cartridge 1 is a conventional cast iron cartridge. This cartridge has a weight of 5.50 pounds. Cartridge 7 is a conventional plastic cartridge. This cartridge has a weight of 1.50 pounds. Cartridge 2 is a cartridge in accordance with certain embodiments of the present invention. It includes an aluminum main body (having the pockets/openings shown), and the stripper locator base and rail-engagement portions are integral to the main body. The punch-retention arms and die-retention arms are formed of steel, and they are removably attached to the main body in the manner shown and described above. Cartridge 3 is another cartridge in accordance with certain embodiments of the invention. Here, the cartridge has an aluminum main body, the rail-attachment portion is integral to the main body, and the stripper locator base is removably attached to the main body. The stripper locator base here is formed of steel, although the cartridge's weight can be further reduced by alternatively using an aircraft metal (or a non-metallic material with a high strength-to-weight ratio). Here again, the punch-retention arms and die-retention arms are formed of steel, and they are removably attached to the main body in the manner shown and described above. Cartridge 4 is yet another embodiment of the invention. This cartridge has an aluminum main body, and both the stripper locator base and the rail-engagement portion are removably attached to the main body. In this embodiment, the stripper locator base and rail-engagement inserts are formed of steel, although the cartridge's weight can be further reduced by alternatively using an aircraft metal (or a non-metallic material with a high strength-to-weight ratio). Here too, the punch-retention arms and the die-retention arms are formed of steel, and they are removably attached to the main body in the manner shown and described above. Cartridge 5 is yet another embodiment. This cartridge is similar to Cartridge 3 except that the main body is formed of carbon fiber rather than aluminum. The carbon fiber can alternatively be replaced with another non-metallic and/or composite material having a high strength-to-weight ratio. The reported weight here reflects steel being used for the arms 14, 16 and for the removable stripper locator base, although this is by no means required. Cartridge 6 is similar to Cartridge 4 except that the main body is formed of carbon fiber rather than aluminum. The carbon fiber can alternatively be replaced with another non-metallic material having a high strength-to-weight ratio. The reported weight here reflects steel being used for the arms 14, 16, for the removable stripper locator base, and for the removable rail-engagement inserts.

| Cartridge No. | Cartridge weight (lbs) | Difference compared to plastic | % heavier than plastic |
|---|---|---|---|
| 1 | 5.50 | 4 | 267% |
| 2 | 1.95 | 0.45 | 30% |
| 3 | 2.25 | 0.75 | 50% |
| 4 | 2.55 | 1.05 | 70% |
| 5 | 1.89 | 0.39 | 26% |
| 6 | 2.22 | 0.72 | 48% |
| 7 | 1.50 | 0 | 0% |

Each cartridge of the tabulated embodiments (Cartridges 2-6) has a weight of less than 3 pounds, which is far less than the 5.50 pound weight of the conventional cast iron cartridge (Cartridge 1). The use of a lighter metal (e.g., aluminum) or non-metal (e.g., carbon fiber), and the provision of pockets/openings, all help to reduce the weight of the cartridge. The weight here is surprisingly close to that of the conventional plastic cartridge. Thus, one or more (e.g., all of) the parts prone to breakage (e.g., the arms, stripper locator base, and rail-engagement inserts) can optionally be formed of a more durable metal, such as steel, while keeping the overall weight of the cartridge under 3 pounds. Also, various coatings and/or surface treatments can be applied to the lighter main body to increase its surface hardness and/or to reduce its coefficients of friction. Thus, in certain embodiments, the invention provides a cartridge having a weight of less than 3 pounds, less than 2.75 pounds, less than 2.5 pounds, less than 2.25 pounds, or even less than 2.0 pounds. Conjointly, the weight can optionally be greater than 1 pound, greater than 1.25 pounds, greater than 1.5 pounds, or even greater than 1.75 pounds. A reduction in weight facilitates moving the cartridge with the necessary accelerations while at the same time reducing wear and tear on the machine tool.

While preferred embodiments of the invention have been described, it should be understood that numerous changes, adaptations, and modifications can be made therein without departing from the spirit of the invention and the scope of the appended claims.

The invention claimed is:

1. A tool set holder cartridge for a machine tool, the cartridge having a main body, two punch-retention arms, and two die-retention arms, wherein the two punch-retention arms are spaced apart and at least generally parallel to each other, the two die-retention arms being spaced apart and at least generally parallel to each other, said main body being formed of a first metal, and said punch-retention arms and said die-retention arms being formed of metal(s) different than said first metal, wherein the punch-retention arms are at least generally parallel to the die-retention arms, and wherein the cartridge includes two spaced apart alignment pins that are at least generally parallel to each other and to the punch-retention arms and the die-retention arms, each of said alignment pins having a circular cross section and being formed of metal.

2. The cartridge of claim 1 wherein the punch-retention arms extend outwardly from an upper portion of said main body, and wherein said die-retention arms extend outwardly from a lower portion of said main body.

3. The cartridge of claim 1 wherein the two punch-retention arms are mounted to said main body such that the punch-retention arms have a limited range of movement toward and away from each other, wherein the punch-retention arms are resiliently mounted to said main body such that the punch-retention arms are resiliently biased toward a default configuration characterized by the punch-retention arms being closer to each other than they are in any other configuration within their limited range of movement.

4. The cartridge of claim 3 wherein the two die-retention arms are mounted to said main body such that the die-retention arms have a limited range of movement toward and away from each other, wherein the die-retention arms are resiliently mounted to said main body such that the die-retention arms are resiliently biased toward a default configuration characterized by the die-retention arms being closer to each other than they are in any other configuration within their limited range of movement.

5. The cartridge of claim 4 wherein both said alignment pins are located between the two die-retention arms and are rigidly mounted to said main body so as to have no freedom of movement relative to said main body.

6. The cartridge of claim 1 wherein said punch-retention arms have a coating that is not on said main body.

7. The cartridge of claim 6 wherein said die-retention arms have a coating that is not on said main body.

8. The cartridge of claim 6 wherein at least a portion of said main body has a coating different than the coating on the punch-retention arms.

9. The cartridge of claim 1 wherein said main body is formed of an aircraft metal.

10. The cartridge of claim 9 wherein said aircraft metal is selected from the group consisting of beryllium, titanium, magnesium, aluminum, and alloys comprising one or more of beryllium, titanium, magnesium, and aluminum.

11. The cartridge of claim 10 wherein said aircraft metal is aluminum.

12. The cartridge of claim 10 wherein said punch-retention arms are formed of steel.

13. The cartridge of claim 1 wherein said main body of the cartridge is devoid of plastic.

14. The cartridge of claim 13 wherein the cartridge has no plastic parts.

15. The cartridge of claim 14 wherein the main body is formed of aluminum.

16. The cartridge of claim 1 wherein the punch-retention arms and the die-retention arms are mounted removably to said main body such that they can be removed and replaced.

17. The cartridge of claim 16 wherein the cartridge includes a stripper locator base comprising two spaced-apart arm portions, wherein the arm portions of the stripper locator base are not mounted resiliently for movement relative to said main body but rather are rigidly disposed relative to said main body so as to have no freedom of movement relative to said main body, the stripper locator base being located between the punch-retention arms and the die-retention arms, wherein the stripper locator base is attached removably to said main body such that the stripper locator base can be selectively removed and replaced.

18. The cartridge of claim 17 wherein at least one of the punch-retention arms, at least one of the die-retention arms, or the stripper locator base has a dry lubricant coating.

19. The cartridge of claim 18 wherein the dry lubricant coating comprises nickel.

20. The cartridge of claim 18 wherein the dry lubricant coating has a coefficient of dynamic friction below 0.18.

21. The cartridge of claim 17 wherein at least one of the punch-retention arms, at least one of the die-retention arms, or the stripper locator base has a coating comprising a material selected from the group consisting of aluminum, a nitride, and a carbide.

22. The cartridge of claim 1 wherein the cartridge includes a rail-engagement insert attached removably to said main body such the rail-engagement insert can be removed and replaced.

23. The cartridge of claim 22 wherein the rail-engagement insert is mounted removably to a rear portion of said main body, said rail-engagement insert defining an outwardly open notch that is at least generally V-shaped.

24. The cartridge of claim 23 wherein the rear portion of said main body is attached to a mount body of a guidance system that is adapted to move the cartridge selectively toward or away from a tool mounting position, wherein the rail-engagement insert is located between said main body of the cartridge and said mount body of the guidance system.

25. The cartridge of claim 22 wherein cartridge has a rear portion and the rail-engagement insert is attached removably to a lower region of said rear portion, and wherein the punch-retention arms and the die-retention arms extend generally away from said main body and generally away from said rear portion of said main body.

26. The cartridge of claim 1 wherein the cartridge includes two rail-engagement inserts mounted removably to said main body such the rail-engagement inserts can be selectively removed and replaced.

27. The cartridge of claim 1 wherein said main body is formed of an aircraft metal selected from the group consisting of beryllium, titanium, magnesium, aluminum, and alloys comprising one or more of beryllium, titanium, magnesium, and aluminum, said punch-retention arms and said die-retention arms are formed of steel, said main body has a first coating, said punch-retention arms and die-retention arms have a second coating, and wherein said second coating has a different composition and/or a different thickness than said first coating.

28. The cartridge of claim 1 wherein the cartridge has a weight of less than 2.75 pounds.

29. The cartridge of claim 28 wherein the cartridge has a weight of less than 2 pounds.

30. The cartridge of claim 1 wherein each lateral side of the cartridge is provided with at least one weight-reduction pocket or opening, wherein a bottom side of the cartridge is provided with at least one weight-reduction pocket or opening, and wherein a front side of the cartridge is provided with at least one weight-reduction pocket or opening.

31. The cartridge of claim 30 wherein each such pocket or opening communicates with at least one of the others.

32. A tool set holder cartridge for a machine tool, the cartridge having a main body, two punch-retention arms, and two die-retention arms, wherein the two punch-retention arms are spaced apart and at least generally parallel to each other, the two die-retention arms being spaced apart and at least generally parallel to each other, said main body being formed of a first metal, and said punch-retention arms and said die-retention arms being formed of metal(s) different than said first metal, wherein the punch-retention arms extend outwardly from an upper portion of said main body, wherein said die-retention arms extend outwardly from a lower portion of said main body, and wherein a middle portion of said main body defines a stripper locator base defining an arc-shaped surface, the stripper locator base being located between the punch-retention arms and the die-retention arms, and wherein said main body comprises a single integral block formed of said first metal, wherein the punch-retention arms are mounted to said single integral block, the die-retention arms are mounted to said single integral block, and wherein said single integral block defines said stripper locator base.

33. The cartridge of claim 3 wherein the cartridge has a weight of less than 2.75 pounds.

34. The cartridge of claim 33 wherein the cartridge has a weight of less than 2 pounds.

35. The cartridge of claim 32 wherein the cartridge has no plastic parts.

36. The cartridge of claim 35 wherein the main body is formed of aluminum.

37. The cartridge of claim 32 wherein each lateral side of the cartridge is provided with at least one weight-reduction pocket or opening, wherein a bottom side of the cartridge is provided with at least one weight-reduction pocket or opening, and wherein a front side of the cartridge is provided with at least one weight-reduction pocket or opening.

38. The cartridge of claim 37 wherein each such pocket or opening communicates with at least one of the others.

39. The cartridge of claim 32 wherein the main body is formed of an aircraft metal while the punch-retention and die-retention arms are formed of different materials from the main body, wherein said aircraft metal is selected from the group consisting of beryllium, titanium, magnesium, aluminum, and alloys comprising one or more of beryllium, titanium, magnesium, and aluminum, and said punch-retention arms and die-retention arms are formed of steel.

40. The cartridge of claim 39 wherein said aircraft metal is aluminum.

41. A tool set holder cartridge for a machine tool, the cartridge having a main body, two punch-retention arms, two die-retention arms, and a stripper locator base, the two punch-retention arms being spaced apart and at least generally parallel to each other, the two die-retention arms being spaced apart and at least generally parallel to each other, the punch-retention arms extending outwardly away from an upper portion of said main body, wherein the two punch-retention arms are mounted to said main body such that the punch-retention arms have a limited range of movement toward and away from each other, the punch-retention arms being resiliently mounted to said main body such that the punch-retention arms are resiliently biased toward a default configuration characterized by the punch-retention arms being closer to each other than they are in any other configuration within their limited range of movement, the die-retention arms extending outwardly away from a lower portion of said main body, wherein the two die-retention arms are mounted to said main body such that the die-retention arms have a limited range of movement toward and away from each other, wherein the die-retention arms are resiliently mounted to said main body such that the die-retention arms are resiliently biased toward a default configuration characterized by the die-retention arms being closer to each other than they are in any other configuration within their limited range of movement, the stripper locator base being mounted to a middle portion of said main body, the stripper locator base comprising two spaced-apart arm portions, wherein the arm portions of the stripper locator base are not mounted resiliently for movement relative to said main body but rather are rigidly disposed relative to said main body, and wherein the punch-retention arms and the die-retention arms and the stripper locator base are mounted removably to said main body such that they can be selectively removed and replaced.

42. The cartridge of claim 41 wherein the cartridge includes a rail-engagement insert attached removably to said main body such the rail-engagement insert can be removed and replaced.

43. The cartridge of claim 42 wherein the rail-engagement insert is mounted removably to a rear portion of said main body, said rail-engagement insert defining an outwardly open notch that is at least generally V-shaped.

44. The cartridge of claim 43 wherein the rear portion of said main body is attached to a mount body of a guidance system that is adapted to move the cartridge selectively toward or away from a tool mounting position, wherein the rail-engagement insert is located between said main body of the cartridge and said mount body of the guidance system.

45. The cartridge of claim 41 wherein the stripper locator base defines an arc-shaped surface and defines a groove having a semi-circular wall section, the stripper locator base being adapted to securely receive a partial extent of a stripper plate having a circular configuration.

46. The cartridge of claim 41 wherein the punch-retention arms and the die-retention arms each have a dry lubricant coating.

47. The cartridge of claim 41 wherein the punch-retention arms and the die-retention arms each have a coating comprising a material selected from the group consisting of aluminum, a nitride, and a carbide.

48. A tool set holder cartridge for a machine tool, the cartridge having two punch-retention arms, two die-retention arms, and a main body formed of a metal, wherein the two punch-retention arms are spaced apart and at least generally parallel to each other, the two die-retention arms being spaced apart and at least generally parallel to each other, wherein the two punch-retention arms are mounted to said main body such that the punch-retention arms have a limited range of movement toward and away from each other, the punch-retention arms being resiliently mounted to said main body such that the punch-retention arms are resiliently biased toward a default configuration characterized by the punch-retention arms being closer to each other than they are in any other configuration within their limited range of movement, wherein the two die-retention arms are mounted to said main body such that the die-retention arms have a limited range of movement toward and away from each other, the die-retention arms being resiliently mounted to said main body such that the die-retention arms are resiliently biased toward a default configuration characterized by the die-retention arms being closer to each other than they are in any other configuration within their limited range of movement, and wherein the cartridge has a weight of less than 3 pounds, wherein each lateral side of the cartridge is provided with at least one weight-reduction pocket or opening, wherein a bottom side of the cartridge is provided with at least one weight-reduction pocket or opening, and wherein a front side of the cartridge is provided with at least one weight-reduction pocket or opening.

49. The cartridge of claim 48 wherein the cartridge has a weight of less than 2.75 pounds.

50. The cartridge of claim 48 wherein the cartridge has a weight of less than 2 pounds.

51. The cartridge of claim 48 wherein each such pocket or opening communicates with at least one of the others.

52. The cartridge of claim 48 wherein said main body is formed of an aircraft metal, and said punch-retention arms and die-retention arms are formed of steel.

53. The cartridge of claim 52 wherein said aircraft metal is aluminum.

54. The cartridge of claim 48 wherein the cartridge has no plastic parts.

55. The cartridge of claim 54 wherein the main body is formed of aluminum.

56. The cartridge of claim 48 wherein the stripper locator base comprises a single, integral piece defining the two spaced-apart arm portions.

57. The cartridge of claim 56 wherein the arm portions of the stripper locator base are not mounted resiliently for movement relative to said main body but rather are rigidly disposed relative to said main body so as to have no freedom of movement relative to said main body.

\* \* \* \* \*